(12) United States Patent
Phillips

(10) Patent No.: US 10,747,863 B2
(45) Date of Patent: *Aug. 18, 2020

(54) VERIFICATION SYSTEM

(71) Applicant: VISITLOCK LLC, Lighthouse Point, FL (US)

(72) Inventor: Kevin Robert Phillips, Deerfield Beach, FL (US)

(73) Assignee: VISITLOCK LLC, Lighthouse Point, FL (US)

( * ) Notice: Subject to any disclaimer, the term of this patent is extended or adjusted under 35 U.S.C. 154(b) by 101 days.

This patent is subject to a terminal disclaimer.

(21) Appl. No.: 15/966,074

(22) Filed: Apr. 30, 2018

(65) Prior Publication Data

US 2018/0322264 A1 Nov. 8, 2018

Related U.S. Application Data

(60) Provisional application No. 62/501,569, filed on May 4, 2017.

(51) Int. Cl.
*G06F 21/32* (2013.01)
*H04L 9/32* (2006.01)
(Continued)

(52) U.S. Cl.
CPC .............. *G06F 21/32* (2013.01); *G01S 19/42* (2013.01); *G06K 9/00006* (2013.01);
(Continued)

(58) Field of Classification Search
CPC ....... G06F 21/32; H04W 4/029; H04W 12/06; H04L 63/0861; H04L 67/22; G06K 9/6289; G06K 9/00899; G01S 19/42
See application file for complete search history.

(56) References Cited

U.S. PATENT DOCUMENTS

2004/0255081 A1* 12/2004 Arnouse ............ G06K 7/10079
711/115
2014/0205155 A1 7/2014 Chung
(Continued)

OTHER PUBLICATIONS

Young, Lee W., PCT Search Report, Application No. PCT/18/018568, dated Jun. 14, 2018, 10 pages, United States Patent and Trademark Office.
(Continued)

*Primary Examiner* — Siamak Harandi
(74) *Attorney, Agent, or Firm* — The Law Firm of AQ Basit

(57) ABSTRACT

A device includes memory and a processor. The device receives biometric information. The device receives location information. The device analyzes the received biometric information with stored biometric information. The device analyzes the received location information with stored location information. The device determines whether the received biometric information matches the stored biometric information. The device determines whether the received location information matches the stored location information. The device sends an electronic communication that indicates whether the received biometric information matches the stored biometric information and whether the received local information matches the stored location information.

20 Claims, 26 Drawing Sheets

(51) Int. Cl.
      *H04L 29/06*      (2006.01)
      *G06K 9/00*       (2006.01)
      *G06K 9/62*       (2006.01)
      *H04W 4/029*      (2018.01)
      *H04W 12/06*      (2009.01)
      *H04L 29/08*      (2006.01)
      *G01S 19/42*      (2010.01)
(52) U.S. Cl.
      CPC ..... *G06K 9/00087* (2013.01); *G06K 9/00221* (2013.01); *G06K 9/00597* (2013.01); *G06K 9/00892* (2013.01); *G06K 9/00899* (2013.01); *G06K 9/6289* (2013.01); *H04L 9/3231* (2013.01); *H04L 63/0861* (2013.01); *H04L 63/12* (2013.01); *H04L 67/22* (2013.01); *H04W 4/029* (2018.02); *H04W 12/06* (2013.01); *G06F 2221/2111* (2013.01)

(56) References Cited

U.S. PATENT DOCUMENTS

| | | |
|---|---|---|
| 2014/0230032 A1 | 8/2014 | Duncan |
| 2014/0281946 A1* | 9/2014 | Avni .................... G06T 1/0021 |
| | | 715/268 |
| 2015/0123766 A1 | 5/2015 | St. John |
| 2017/0193622 A1* | 7/2017 | Rosado ................. G08B 21/22 |
| 2018/0039990 A1* | 2/2018 | Lindemann ............ G06F 21/31 |

OTHER PUBLICATIONS

Young, Lee W., PCT Search Report, Application No. PCT/191030024, dated Aug. 22, 2019, 11 pages, United States Patent and Trademark Office.

* cited by examiner

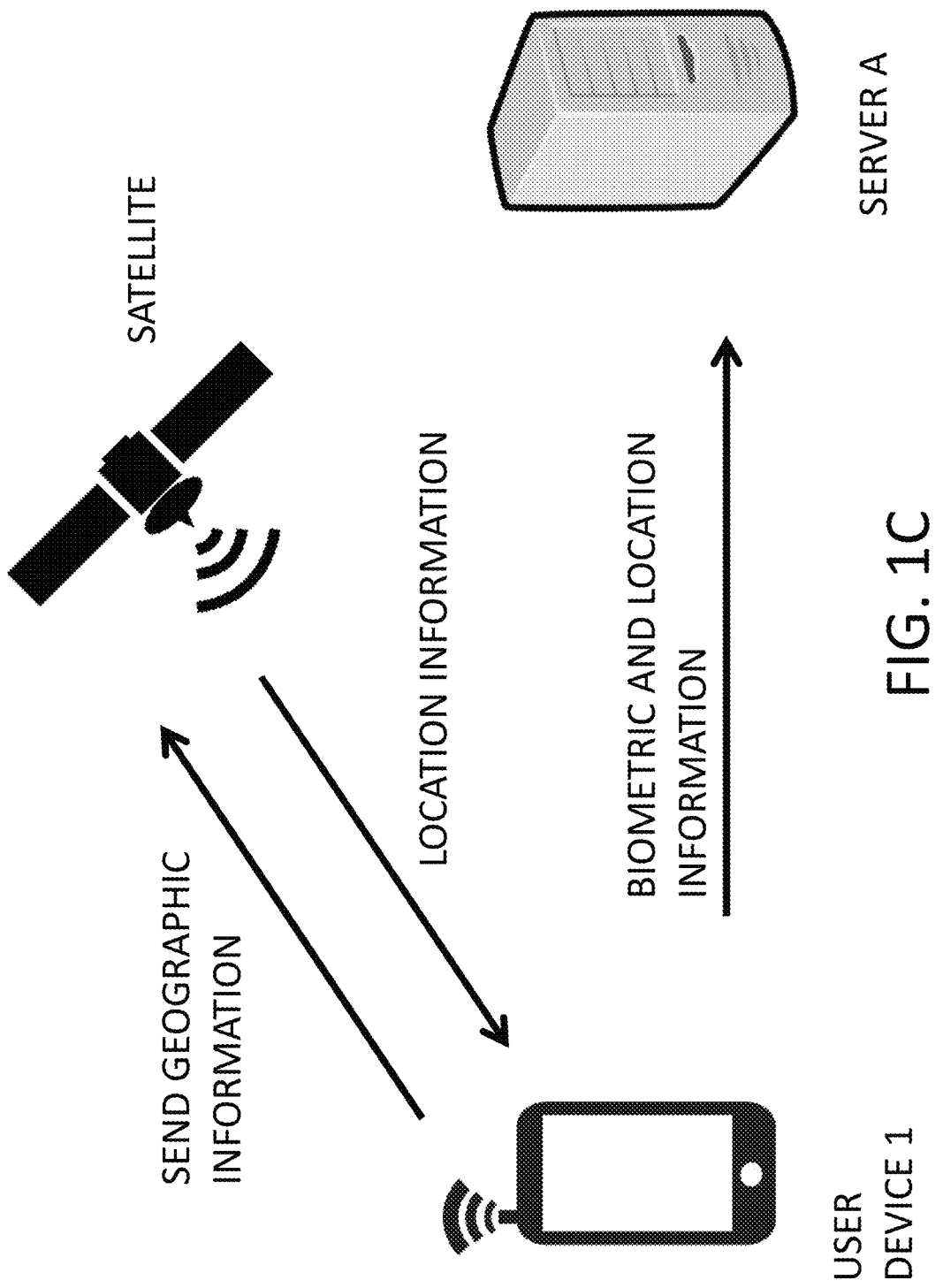

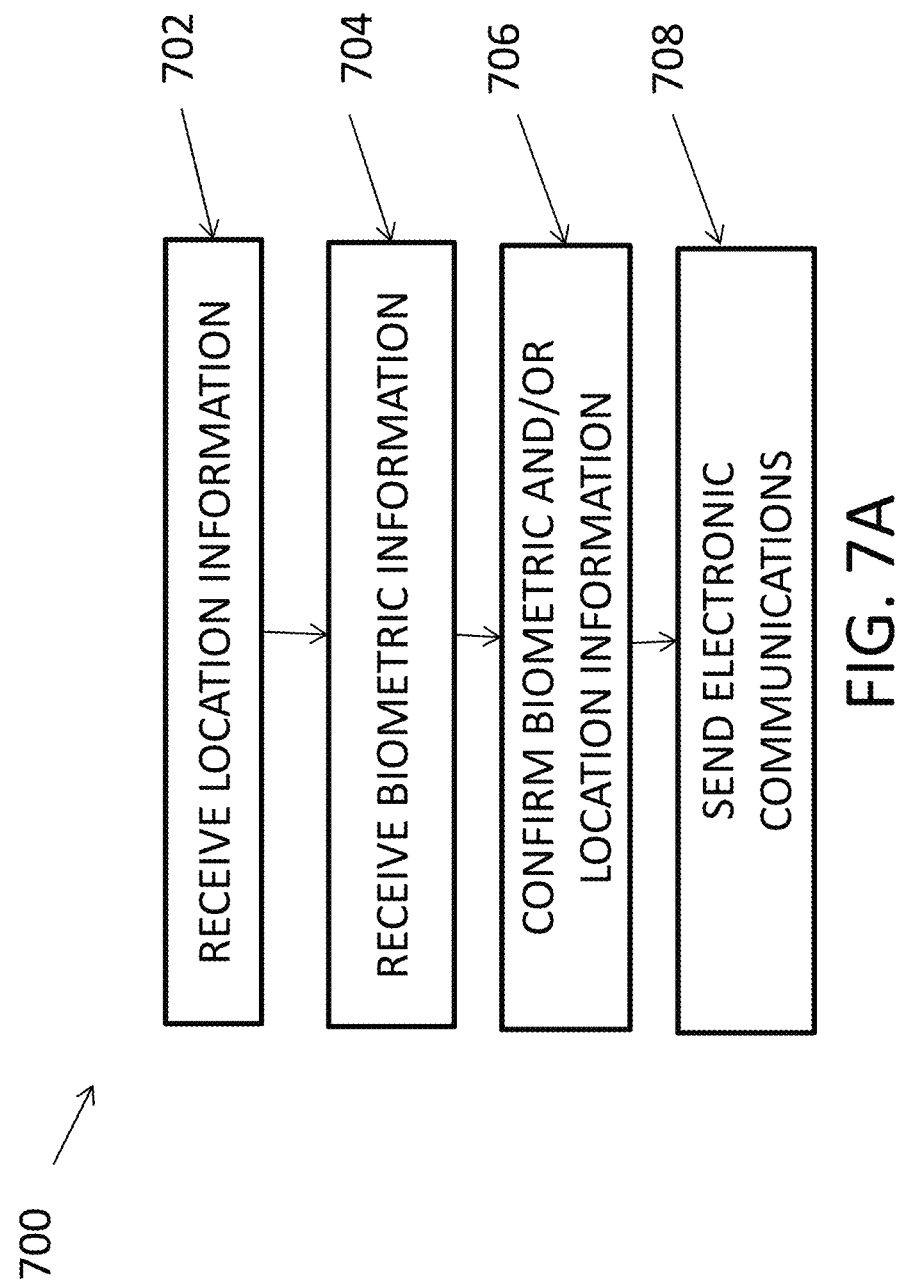

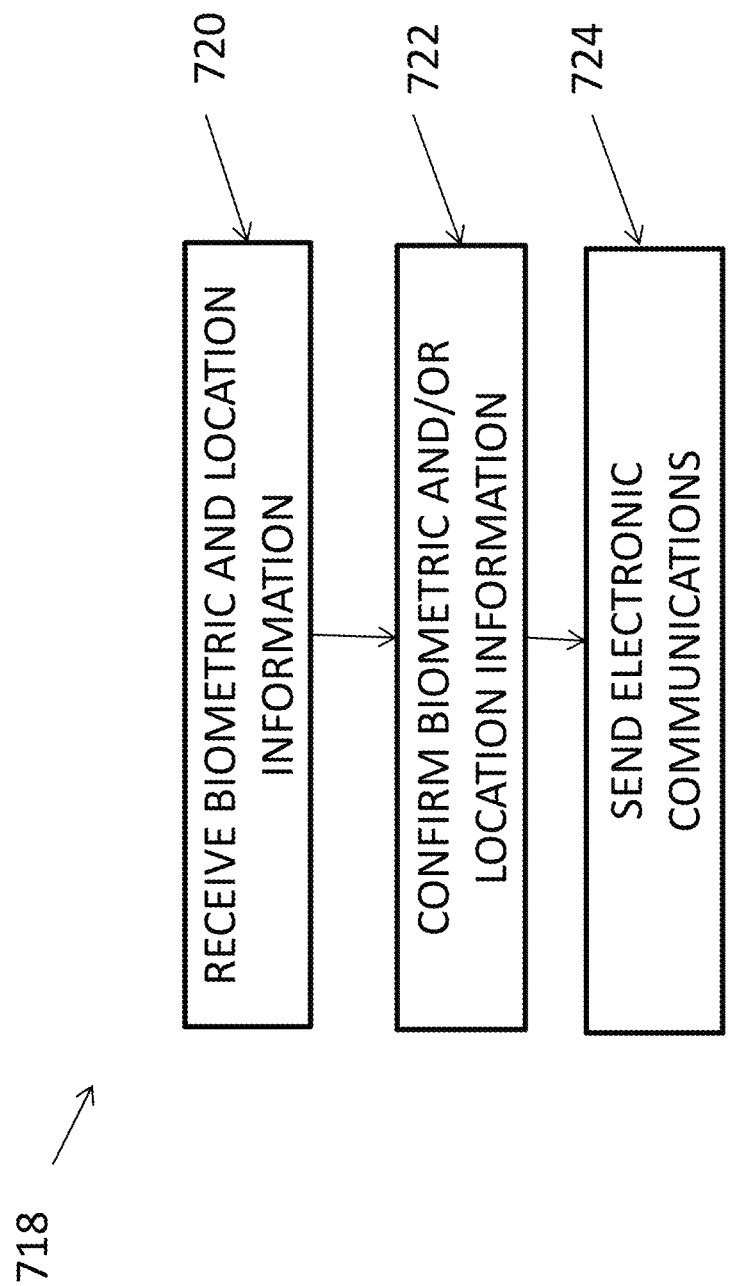

| ID (902) | BIOMETRIC (904) | LOCATION (906) |
|---|---|---|
| A2C | 8 | 2 |
| K8Y | 2 | 6 |
| 9V7 | 14 | 3 |
| ● ● | ● ● | ● ● |

| ID (1002) | BIOMETRIC (1004) | LOCATION (1006) | CONFIRMED (1008) |
|---|---|---|---|
| A2C | 8 | 2 | Y |
| K8Y | 2 | 6 | N |
| 9V7 | NULL | 3 | N |
| • • | • • | • • | • • |

FIG. 10

| ID (1102) | CONFIRM (1104) | STATUS (1106) | OTHER (1108) |
|---|---|---|---|
| JANE X | YES | VISITOR VISA | PASSPORT 1 |
| BARRY T | YES | EMPLOYEE VISA | PASSPORT 3 |
| JOSEPH B | NULL | NULL | NULL |
| ● | ● | ● | ● |
| ● | ● | ● | ● |

VERIFICATION SYSTEM

BACKGROUND

At any given time, any person may be at any particular location. There may be other organizations that may require confirmation of the person at a particular location to ensure that the person is at that location. Currently, there is no way of confirming that the person is at the location conducting those services based on the person's biometric information.

BRIEF DESCRIPTION OF DRAWINGS

FIGS. 1A-1D are diagrams of an example environment in which systems and/or methods described herein may be implemented;

FIGS. 7A-7C are flow charts of example processes for confirming electronic information;

FIGS. 9-11 are example database structures that store electronic information;

DETAILED DESCRIPTION OF PREFERRED EMBODIMENTS

Figure 1A:
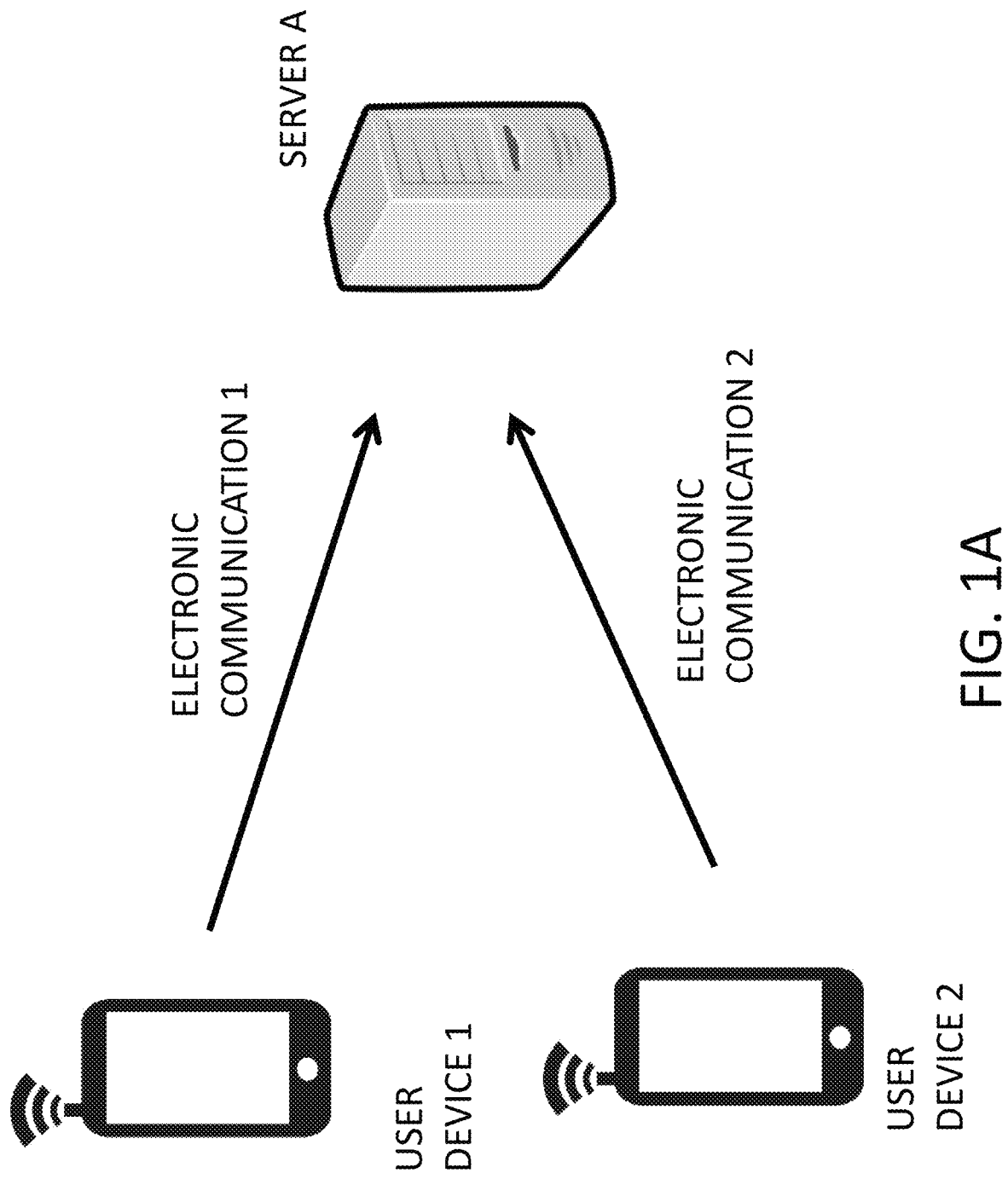

The following detailed description refers to the accompanying drawings. The same reference numbers in different drawings may identify the same or similar elements.

Systems, devices, and/or methods described herein may allow for a user, using an electronic application implemented on a computing device (e.g., smartphone, laptop, etc.), to verify that the user is at a particular geographic location based on the user's biometric information. In verifying the user's geographic location, a government or other organization may confirm that a person is located at a particular place at a particular time. For example, an individual who is on probation from prison and is required to provide confirmation of location at a particular time. In another non-limiting example, an individual may be inside a country based on a particular type of visa and a government entity (e.g., Customs and Border Patrol) may want to confirm the individual's location at a particular time.

The registration information may include the person's name, gender, date of birth, employer information, government-issued licensure information, and/or any other information (e.g., immigration visa number, passport number, citizenship, etc.). In this non-limiting example, a person, who is on a business visa in the United States, may receive a communication (e.g., email or phone call) that requests the person to provide biometric information (e.g., fingerprint information, iris information, voice information, etc.) that is electronically analyzed by the electronic application. In another non-limiting example, a person, who is on probation and is required to stay within a particular geographic location (e.g., Miami, Fla.) may be required to verify their location at a particular geographic location at a particular time. In this non-limiting example, a law enforcement officer (e.g., a probation officer, a police officer, etc.) may also have registered with the electronic application and provided information regarding their own person's name, gender, governmental agency information, badge information, and/or any other information. In this non-limiting example, when the law enforcement officer arrives at the person of interest's home, the law enforcement officer may electronically display an electronic page that requests the law enforcement officer to provide biometric information (e.g., fingerprint information, iris information, voice information, etc.) that is electronically analyzed by the electronic application. Accordingly, the electronic application may send an electronic communication to a computing device (e.g., a server) to verify the biometric information and verify the law enforcement's geographic location. In this non-limiting example, the person of interest may also provide their biometric information and/or geographic location via the electronic application to the computing device. Accordingly, the computing device may determine that the person of interest and the law enforcement officer are both at the same or similar geographic location and provide permissions for other electronic transactions and/or communications to occur.

By having one's location and identity verified according to the one or more, methods, processes, or systems described in the following figures, other electronic communications may occur and/or additional confirmations. Furthermore, the electronic application may be used to comply with regulations associated the enforcement of immigration and criminal laws.

Accordingly, the electronic application may provide one or more electronic processes that (1) obtain biometric information about one or more persons, (2) electronically receive and verify biometric information about the one or more persons, (3) obtain and verify the geographic location of the one or more persons associated with the biometric information and that one or more people are at the same location at the same, or similar, time, (4) in real-time and/or simultaneously, generate additional electronic communications that permit additional electronic transactions to occur, and (5) use the verification to comply with one or more government regulations. Thus, technological features described in the following figures provide for a verification process that requires computer-based technology and cannot be performed outside a computing technological environment.

Figure 1B:
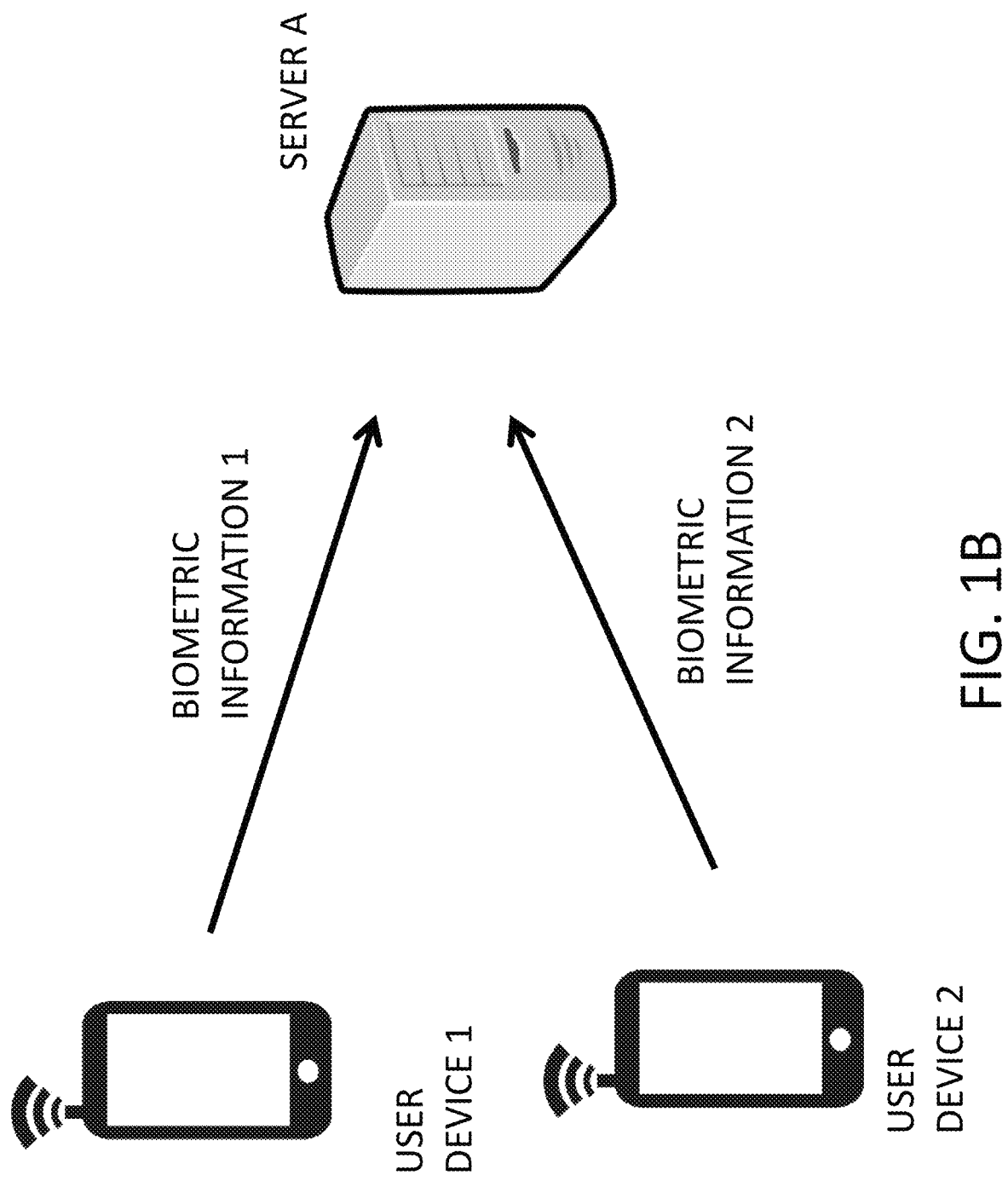
Figure 1D:
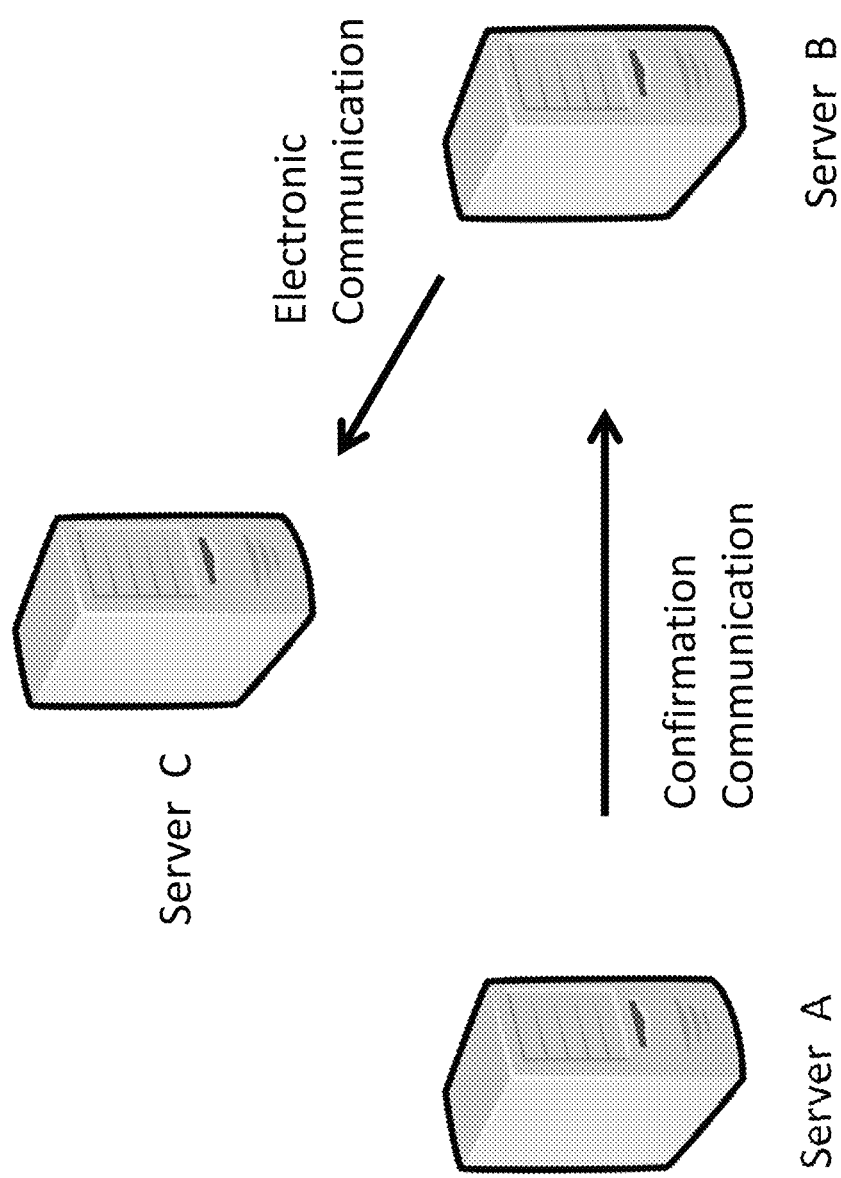

FIGS. 1A-1D describe an example process of verifying one or more persons based on their biometric and location information. FIGS. 1A and 1B describe a process for registering one or more persons with an electronic application. FIG. 1C describes providing biometric and location information and verifying the biometric and location information. FIG. 1D describes sending one or more electronic communications based on verifying the biometric and location information. As shown in FIG. 1A, user device 1 and 2 (e.g., a smartphone, a laptop, a computing device, etc.) may each send an electronic communication (electronic communication 1 and 2, respectively) to server A for purposes of registering a law enforcement professional (e.g., border patrol officer, police officer, probation officer, etc.) and a person of interest with an electronic application. In this non-limiting example, electronic communication 1 may include registration information about the law enforcement professional. Thus, electronic communication 1 may include the law enforcement professional's name, government agency, badge number, and/or any other information associated with the ability for the law enforcement professional to provide law enforcement. Electronic communication 2 may include registration information about a person of interest who may have received requirements to confirm their location and/or other information associated with immigration and/or criminal laws.

Thus, electronic communication 2 may include the person of interest's name, address (e.g., one or more locations where the person of interest resides), identifier information (e.g., social security, passport number, visa number, etc.), age, and/or any other information associated with the ability of the person of interest to comply with various laws. Thus, server A may receive electronic communications 1 and 2 and generate a registration identifier for the law enforcement professional and the person of interest. Alternatively, or additionally, server A may generate a registration identifier for the person of interest.

For registering with the electronic application, as shown in FIG. 1B, user device 1 may send biometric information 1 to the server and user device 2 may send biometric information 2 to server A. In this non-limiting example, biometric information 1 may include biometric information that is electronically obtained by user device 1 and electronically sent to server A. Biometric information 1 may include fingerprint information, retina information, facial information, audible (e.g., voice) information, and/or any other type of biometric information. In this non-limiting example, biometric information 1 may be associated with a law enforcement professional (e.g., a police officer, a probation officer, etc.). Biometric information 2 may include fingerprint information, retina information, facial information, audible (e.g., voice) information, and/or any other type of biometric information. In this non-limiting example, biometric information 2 may be associated with a person of interest who may require their identity, location, and time information to be confirmed. Server A may store biometric information 1 and 2. While electronic communication 1 and biometric information 1 are shown as two separate communications, they may be sent as one electronic communication. Similarly, while electronic communication 2 and biometric information 2 are shown as two separate communications, they may be sent together as another electronic communication. Furthermore, while electronic communication 1 and biometric information 1 are shown as being sent from user device 1, and electronic communication 2 and biometric information 2 are being sent from user device 2, electronic communications 1 and 2, and biometric information 1 and 2, may be sent from a single user device.

As shown in FIG. 1C, at a later time, the law enforcement professional may be at the person of interest's home and may send an electronic communication that includes both the law enforcement professional's biometric and current location information. As shown in FIG. 1C, a global positioning system (GPS) satellite receives information from user device 1 and sends back electronic location information. With the electronic information, user device 1 now has both the electronic location and biometric information. The electronic communication, including the biometric information and the current location, may be sent based on inputting the biometric information into the electronic application. This electronic information may be sent as a requirement for other electronic transactions to occur based on providing a service by the law enforcement professional to a person of interest. As shown FIG. 1C, the biometric and electronic information is sent to server A (via a network or other communications system) along with a particular time associated with the biometric and electronic information. While FIG. 1C shows a satellite, location information may be generated by using other technologies, such as telecommunication towers, eNodeB towers, etc. In alternate embodiments, user device 1 may be associated with a person of interest who uses user device 1 to (1) send information to the GPS satellite, (2) receive electronic location information from the GPS satellite, (3) send biometric and electronic location information to server A.

Upon receiving the biometric and current location information of the law enforcement professional, server A may confirm the received biometric information of the law enforcement professional and/or person of interest with the stored biometric information of the law enforcement professional and/or person of interest sent to server A and as described in FIG. 1B. Furthermore, server A may confirm that the law enforcement professional and the person of interest are at the same location at the same, or similar, time based on when the communication was sent from the law enforcement professional's user device with at time associated with any communication (not shown in the FIGS. 1C-1D) sent from the person of interest's user device. In this non-limiting example, server A may determine that the store biometric information (as sent in FIG. 1B) matches the received biometric information as described in FIG. 1C. Thus, as shown in FIG. 1D, server A sends a confirmation communication to server B and C. In this non-limiting example, server B may determine that based on the confirmation of biometric, time, and/or location information that a visit by a law enforcement professional was conducted and an electronic communication including one or more additional electronic communications is sent from server B to server C.

Thus, as shown in FIGS. 1A-1D, a person may (1) undergo a registration process that requires providing registration information that includes biometric information, (2) provide biometric information and/or location information that is used to confirm that particular person (or a person associated with an entity) visited the person of interest's home or other location, at the same, or similar, time that a person of interest is at the same location and (3) upon confirmation, provide other electronic communications (e.g., validation of immigration status, probation status, etc.) to an entity associated with the law enforcement professional or person of interest based on confirming the biometric and/or location information.

Figure 2:
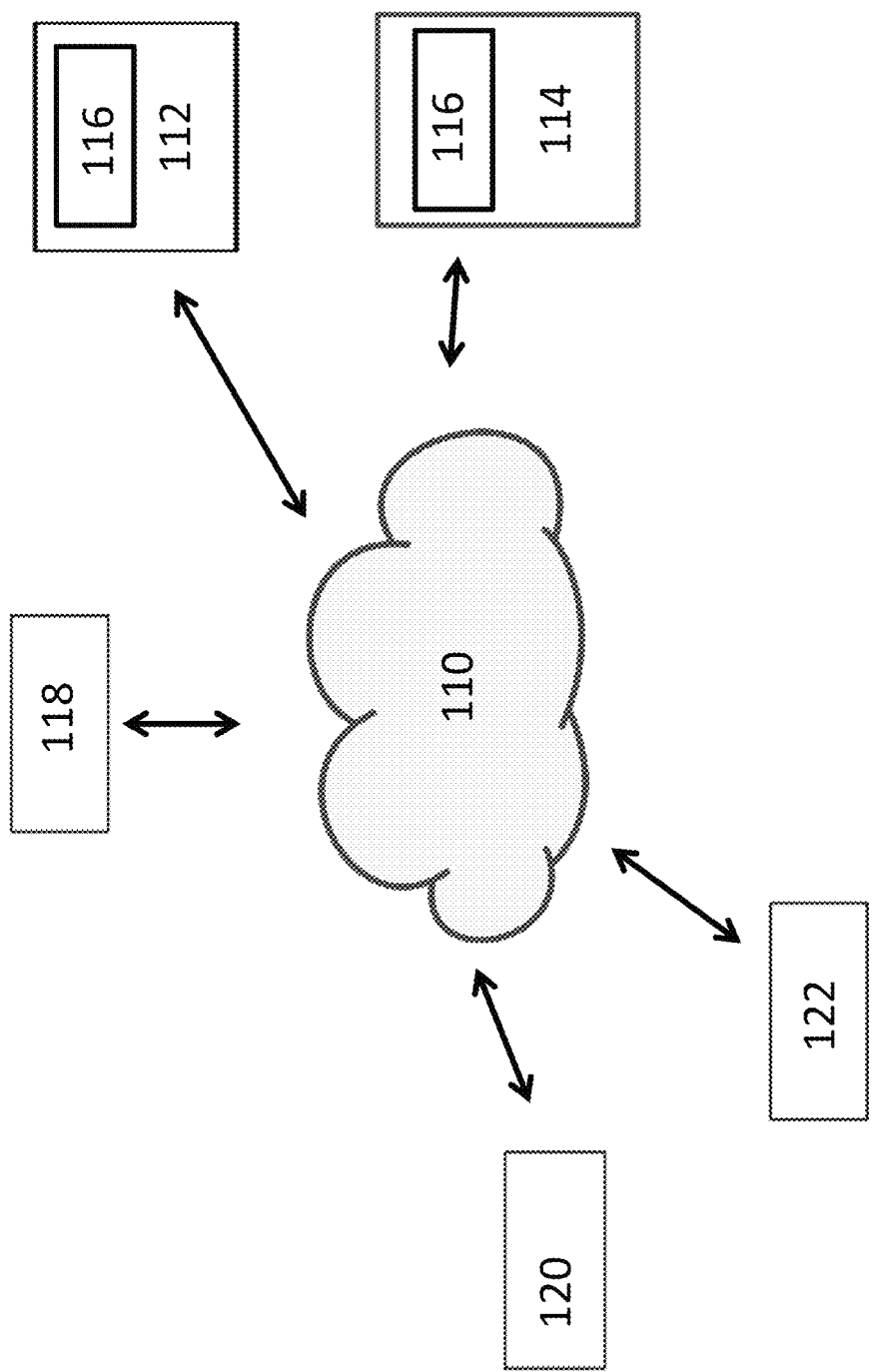
FIG. 2 is a diagram of a network environment.

FIG. 2 is a diagram of example environment 100 in which systems, devices, and/or methods described herein may be implemented. FIG. 1 shows network 110, user device 112, user device 114, electronic application 116, verification server 118, GPS satellite 120, and server 122.

Network 110 may include a local area network (LAN), wide area network (WAN), a metropolitan network (MAN), a telephone network (e.g., the Public Switched Telephone Network (PSTN)), a Wireless Local Area Networking (WLAN), a WiFi, a hotspot, a Light fidelity (LiFi), a Worldwide Interoperability for Microware Access (WiMax), an ad hoc network, an intranet, the Internet, a satellite network, a GPS network, a fiber optic-based network, and/or combination of these or other types of networks. Additionally, or alternatively, network 110 may include a cellular network, a public land mobile network (PLMN), a second generation (2G) network, a third generation (3G) network, a fourth generation (4G) network, a fifth generation (5G) network, and/or another network. In embodiments, network 110 may allow for devices describe any of the described figures to electronically communicate (e.g., using emails, electronic signals, URL links, web links, electronic bits, fiber optic signals, wireless signals, wired signals, etc.) with each other so as to send and receive various types of electronic communications.

User device 112 and/or 114 may include any computation or communications device that is capable of communicating with a network (e.g., network 110). For example, user device 112 and/or user device 114 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a desktop computer, a laptop computer, a tablet computer, a camera, a personal gaming system, a television, a set top box, a digital video recorder (DVR), a digital audio recorder (DUR), a digital watch, a digital glass, or another type of computation or communications device.

User device 112 and/or 114 may receive and/or display content. The content may include objects, data, images, audio, video, text, files, and/or links to files accessible via one or more networks. Content may include a media stream, which may refer to a stream of content that includes video content (e.g., a video stream), audio content (e.g., an audio stream), and/or textual content (e.g., a textual stream). In embodiments, an electronic application may use an electronic graphical user interface to display content and/or information via user device 112 and/or 114. User device 112 and/or 114 may have a touch screen and/or a keyboard that allows a user to electronically interact with an electronic application. In embodiments, a user may swipe, press, or touch user device 112 and/or 114 in such a manner that one or more electronic actions will be initiated by user device 112 and/or 114 via an electronic application.

User device 112 and/or 114 may include a variety of applications, such as, for example, biometric a verification application, an e-mail application, a telephone application, a camera application, a video application, a multi-media application, a music player application, a visual voice mail application, a contacts application, a data organizer application, a calendar application, an instant messaging application, a texting application, a web browsing application, a blogging application, and/or other types of applications (e.g., a word processing application, a spreadsheet application, etc.).

Electronic application 116 may be capable of interacting with user device 112, user device 114, authentication server 118, GPS satellite 120, and/or server 122 to automatically and electronically receive electronic information for one or more persons. In embodiments, electronic application 116 may obtain electronic information about a person's identity, such as name, address, age, profession, biometric information, identifier information (e.g., social security information, health insurance information), and/or any other type of information. In embodiments, electronic application 116 may verify a person's location based on biometric and location information. In embodiments, electronic application 116 may be electronically configured to show photos, video, text, icons, graphical images, buttons, emojis, and/or any other electronic information. While FIG. 2 shows electronic application 116 on user device 112 and user device 114, some or all of the electronic processes performed by electronic application 116 may be stored by verification server 118.

Verification server 118 may include one or more computational or communication devices that gather, process, store, and/or provide information relating to one or more electronic pages associated with electronic application 116 that is searchable and viewable over network 110. While FIG. 2 shows a verification server 118 there may be additional verification servers 118 associated with one or more electronic applications 116. In embodiments, verification server 118 may receive electronic information based on a person's geographic location information and biometric information and verify a person's identity and/or location. In embodiments, geographic location information may include street number, street name, street type, village, town, city, county, state, and/or country information. In embodiments, biometric information may include fingerprint information, retina information, facial information, voice information, and/or any other type of biometric information.

GPS satellite 120 may include one or more computational or communication devices that gather, process, store, and/or provide information relating to one or more location information. In embodiments, GPS satellite 120 may use one or more features of the global positioning system.

Server 124 may include one or more computational or communication devices that gather, process, store, and/or provide information relating to generate one or more electronic communications and/or electronic transactions based on a determination by verification server 118 that one or more persons have been verified to have performed a service at a particular geographic location, and/or one or more persons have been verified to have received a service at the same or similar geographic location.

Figure 3:
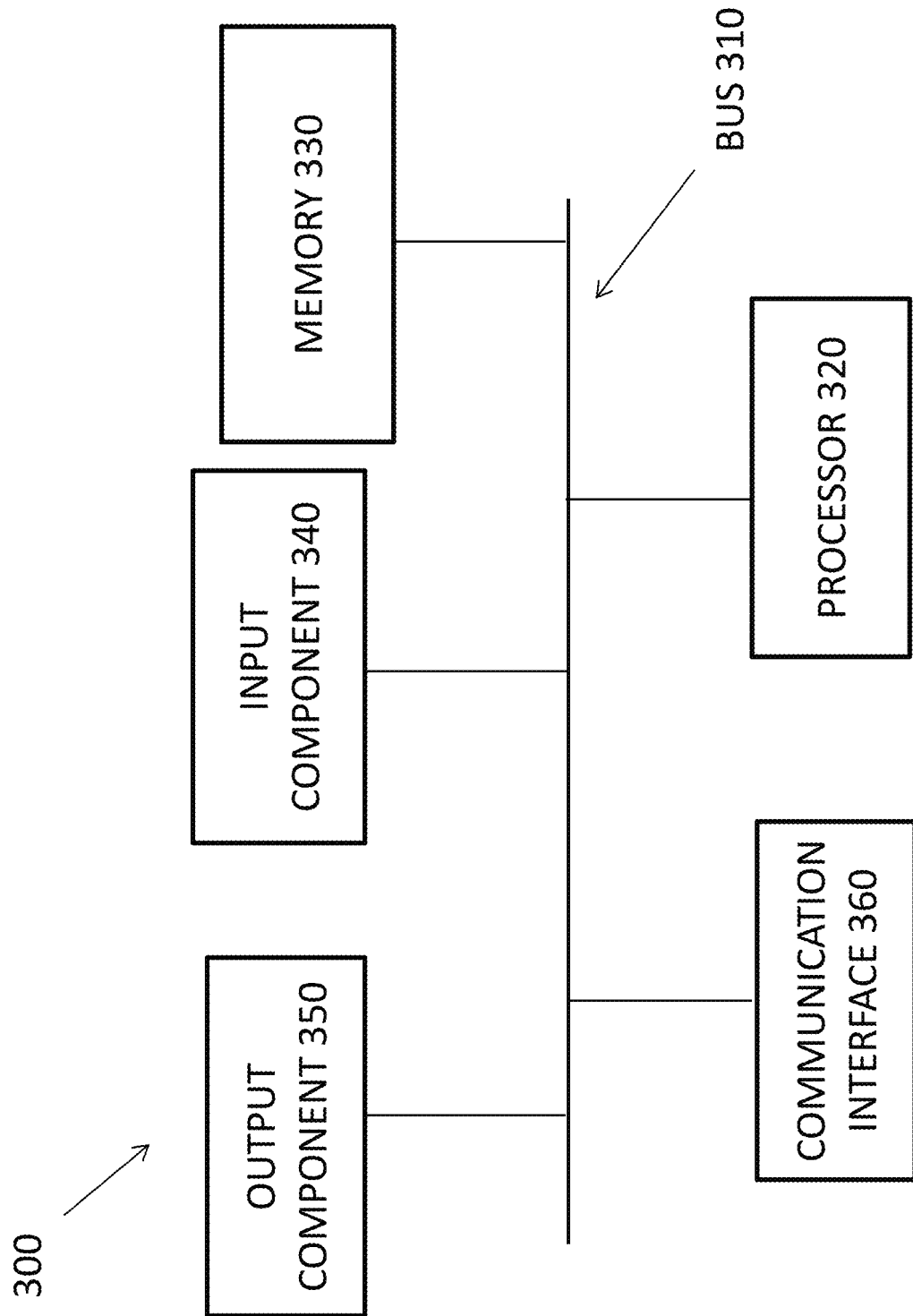
FIG. 3 is a diagram of an example computing device.

FIG. 3 is a diagram of example components of a device 300. Device 300 may correspond to user device 112, user device 114, verification server 118, GPS satellite 120, and server 122. Alternatively, or additionally, user device 112, user device 114, verification server 118, GPS satellite 120, and server 122 may include one or more devices 300 and/or one or more components of device 300.

As shown in FIG. 3, device 300 may include a bus 310, a processor 320, a memory 330, an input component 340, an output component 350, and a communications interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communications among the components of device 300. Processor 320 may include one or more processors, microprocessors, or processing logic (e.g., a field programmable gate array (FPGA) or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320. Input component 340 may include a mechanism that permits a user to input information to device 300, such as a keyboard, a keypad, a button, a switch, voice command, etc. Output component 350 may include a mechanism that outputs information to the user, such as a display, a speaker, one or more light emitting diodes (LEDs), etc.

Communications interface 360 may include any transceiver-like mechanism that enables device 300 to communicate with other devices and/or systems. For example, communications interface 360 may include an Ethernet interface, an optical interface, a coaxial interface, a wireless interface, or the like.

In another implementation, communications interface 360 may include, for example, a transmitter that may convert baseband signals from processor 320 to radio frequency (RF) signals and/or a receiver that may convert RF signals to baseband signals. Alternatively, communications interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communications interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communications interface 360 and transmit the RF signals over the air, and receive RF signals over the air and provide the RF signals to communications interface 360. In one implementation, for example, communications interface 360 may communicate with network 110.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4A:
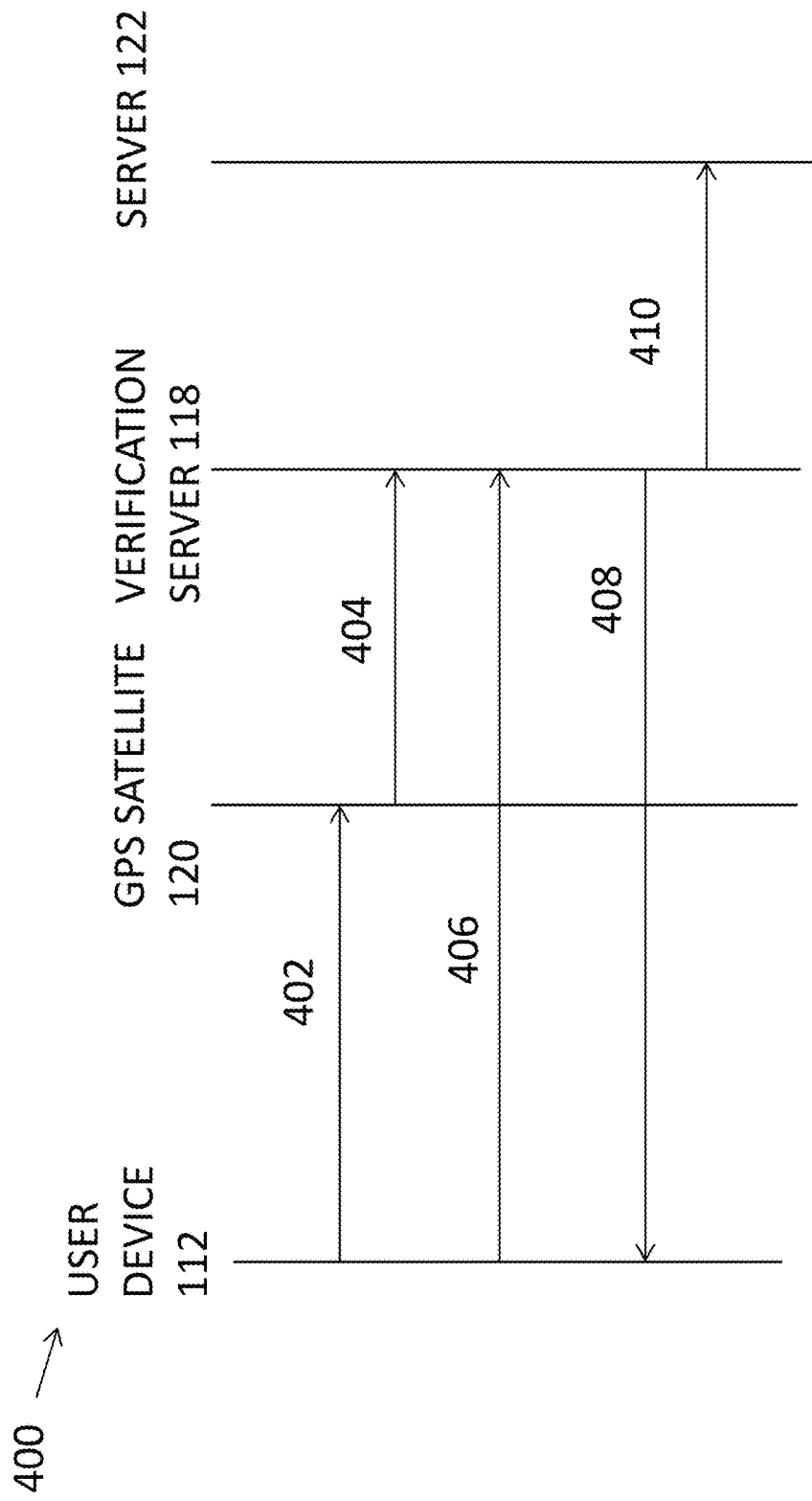
FIGS. 4A, 4B, and 4C are flow diagrams of example communications.

FIG. 4A describes an example communication flow process 400 for confirming a person's identity and location. As shown, FIG. 4A includes user device 112, verification server 118, GPS satellite 120, and server 122. In embodiments, for FIGS. 4A, 4B, and 4C, a user has already been registered as a law enforcement professional with electronic application 116 so that verification server 118 has stored biometric and other identification information about the law enforcement professional and/or person of interest. In embodiments, user device 112 has electronic application 116 downloaded or one or more electronic page associated with electronic application 116.

In embodiments, the user, of user device 112, may be at the same location as the person of interest (e.g., person of interest's home, employment location, etc.) and is required to send confirmation that the user is at the same location of the person of interest. In embodiments, user device 112 may send a ping or other electronic communication, automatically, to verification server 118, with geographic location information which, in result, may cause verification server 118 to send an electronic communication message (e.g., a text message, email, phone call) at a particular period of time, to user device 112 that biometric information is required to be sent from user device 112.

Alternatively, verification server 118 may store information about future times and geographic locations associated with a user of user device 112, and verification server 112 may send, at a particular time (e.g., 30 minutes before a scheduled visit, one hour before a scheduled visit, etc.), a reminder message (e.g., a text, email, phone call, etc.) to user device 112 to remind the user (e.g., the law enforcement professional) of the appointment to use electronic application 116 to send biometric and/or location information.

In embodiments, no confirmation or reminder electronic communications may occur between user device 112 and verification server 118 before a user (e.g., the law enforcement professional), of user device 112 is on their way or arrives at a person of interest's geographic location (e.g., a home, nursing home, assisted living facility, etc.).

In embodiments, as shown in FIG. 4A, user device 112 may send an electronic communication 402 to GPS satellite 120. In embodiments, electronic communication 402 may include information that is sent to GPS satellite 120. In embodiments, GPS satellite 120 may analyze electronic communication 402 and send location information, in electronic communication 404, to verification server 118. In embodiments, user device 112 may send electronic communications 406 upon entry of the law enforcement professional's biometric information by the law enforcement professional. In embodiments, the biometric information may be fingerprint information based on the user placing a finger (or thumb) onto the screen of user device 112, or based on the user placing the finger (or thumb) near user device 112 (e.g., within one centimeter of the screen of user device 112) with user device 112 capturing characteristics of the fingerprint.

Alternatively, the biometric information may be retina information that is obtained by user device 112 (and electronic application 116) by placing user device 112 within a particular distance (e.g., within one feet, two feet, etc.) of the user's retina. Thus, electronic application 116 may electronically capture characteristics of the retina. Alternatively, the biometric information may be facial information that is obtained by user device 112 (and electronic application 116) by placing user device 112 within a particular distance (e.g., within one foot, two feet, etc.) of the user's face so that the entire user face may be electronically analyzed by electronic application 116. Alternatively, the biometric information may be voice information of the user that is obtained by user device 112 (and electronic application 116) by having the user to speak into a microphone device associated with user device 112. In embodiments, the biometric information may be a combination of different types of information, such as fingerprint, retina, facial, and/or voice information.

In embodiments, verification server 118 may receive electronic communication 406 and electronically analyze the biometric information with stored biometric information of the user that has been previously provided by the user to verification server 118. In embodiments, verification server 118 may determine that the biometric information matches the stored biometric information or the biometric information does not match the stored biometric information. In embodiments, if the biometric information matches, then verification server 118 may send an electronic confirmation communication to user device 112 and/or other computing devices that the biometric information matches. In embodiments, if the biometric information does not match, then verification server 118 may send an electronic non-confirmation communication to user device 112 and/or other computing devices that the biometric information does not match. Alternatively, verification server 118 may send the electronic confirmation or non-confirmation communications after receiving the geographic location information in electronic communication 404.

In embodiments, verification server 118 may compare the geographic location of user device 112 with store location information of the person of interest to confirm that the law enforcement professional is at the same or similar location as the person of interest (e.g., the law enforcement professional is within 5 feet, 10 feet, 20 feet, etc. of the person of interest). In embodiments, verification server 118 may send an electronic communication (electronic communication 408) to user device 112 and another electronic communication (electronic communication 410) to server 122 based on the comparison of the received biometric and geographic information with stored biometric and geographic information. In embodiments, electronic communication 404 may include a time that electronic communication 404 was sent from the law enforcement professional's user device. In embodiments, verification server 118 may compare the sent time of electronic communication 404 with the time sent of an electronic communication by a person of interest's user device that indicates whether the person of interest and the law enforcement professional were at the same place at the same time (e.g., based on communications sent within 10 seconds, 30 seconds, five minutes, etc., by a law enforcement professional user device and a person of interest user device). In embodiments, the sent time may be an electronic time stamp that includes time, day, month, and/or year information. Thus, if the electronic communications are sent within each other and below a particular threshold (e.g., within less than 10 seconds, five minutes, etc.), verification server 118 may verify identities and also determine that the law enforcement professional and the person of interest are at the same location at the same time.

In embodiments, electronic communications 408 and 410 may include a confirmation message that the biometric information confirms the identity of the user and the geographic location information confirms that the user is at a person of interest's location (e.g., another person's home, nursing home, etc.). Alternatively, electronic communications 408 and 410 may include a non-confirmation message that the biometric information does not confirm the identity of the user or the geographic location information from user device 112 does not match the person of interest's geographic information. In embodiments, electronic communication 408 may provide confirmation to the law enforcement professional that verification has occurred. In embodiments, electronic communication 410 may be used by server 122 to confirm that verification has occurred.

Figure 4B:
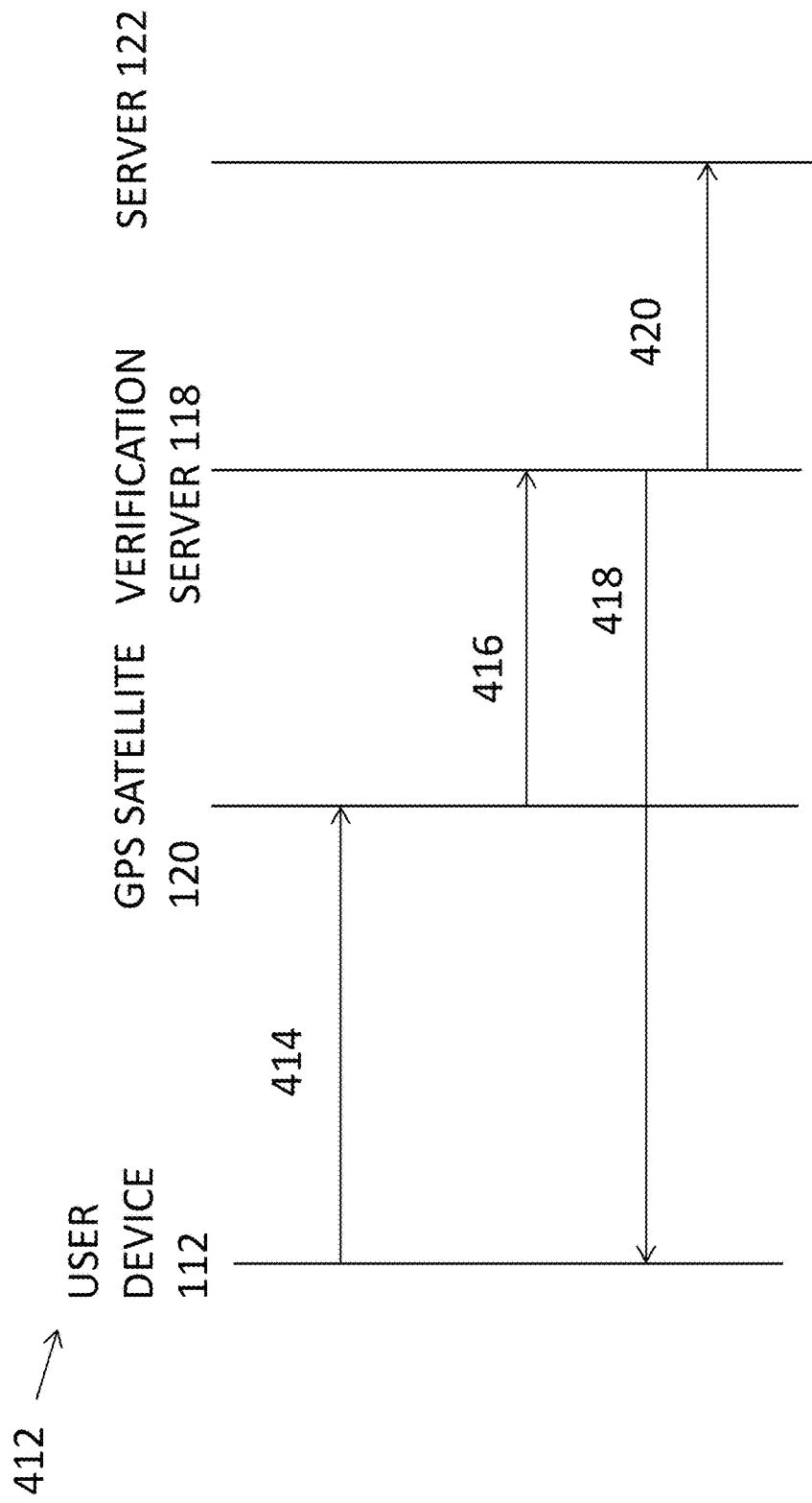

FIG. 4B describes an example communication flow process 412 for confirming a person's identity and location. As shown, FIG. 4B includes user device 112, verification server 118, GPS satellite 120, and server 122. In embodiments, for FIG. 4B, a user has been registered as a law enforcement professional with electronic application 116 so that verification server 118 has biometric and other identification information about the user. In embodiments, user device 112 has electronic application 116 downloaded or one or more electronic page associated with electronic application 116.

In embodiments, the user (e.g., a law enforcement professional), of user device 112, may be at the same location, at the same time, as a person of interest and is required to send confirmation that the user is at a particular location. In embodiments, user device 112 may automatically send a ping or other type of electronic communication to verification server 118, with geographic location information which, in result, may cause verification server 118 to send an electronic communication message (e.g., a text message, email, phone call) at a particular period of time, to user device 112 that a confirmation message is required to be sent from user device 112.

Alternatively, verification server 118 may store information about future times and geographic locations associated with a user of user device 112, and verification server 112 may send, at a particular time (e.g., 30 minutes before a scheduled visit, one hour before a scheduled visit, etc.), a reminder message (e.g., a text, email, phone call, etc.) to user device 112 to remind the user (e.g., the law enforcement professional) of the appointment.

In embodiments, no confirmation or reminder electronic communications may occur between user device 112 and verification server 118 before a user, of user device 112, is on their way or arrives at a person of interest's geographic location (e.g., a home, place of employment, etc.).

In embodiments, as shown in FIG. 4B, user device 112 may send an electronic communication 414 to GPS satellite 120. In embodiments, electronic communication 414 may include biometric information that is provided by the user, and information associated with the user's location. In embodiments, the biometric information may be fingerprint information based on the user placing a finger (or thumb) onto the screen of user device 112, or based on the user placing the finger (or thumb) near (e.g., within one centimeter of the screen of user device 112) and user device 112 capturing characteristics of the fingerprint.

Alternatively, the biometric information may be retina information that is obtained by user device 112 (and electronic application 116) by placing user device 112 within a particular distance (e.g., within one feet, two feet, etc.) of the user's retina. Thus, electronic application 116 may electronically capture characteristics of the retina. Alternatively, the biometric information may be facial information that is obtained by user device 112 (and electronic application 116) by placing user device 112 within a particular distance (e.g., one foot, two feet, etc.) of the user's face so that the entire user face may be electronically analyzed by electronic application 116. Alternatively, the biometric information may be voice information of the user that is obtained by user device 112 (and electronic application 116) by having the user to speak into a microphone device associated with user device 112. In embodiments, the biometric information may be a combination of different types of information, such as fingerprint, retina, facial, and/or voice information.

In embodiments, electronic communication 414 may also include information that can be used to determine location information of the user based on the location of user device 112. In embodiments, electronic communication 414 may be sent by receiving the biometric information. In embodiments, GPS satellite 120 may generate electronic information based on electronic communication 414 and send the location and biometric information in electronic communication 416. In embodiments, electronic communication 414 may also include time information associated with when the biometric and location information is sent. Thus, the time of when electronic communication 414 was sent may be compared to a time of when another electronic communication associated with the person of interest is sent so as to determine that the communications were sent within a particular period of time (e.g., five seconds, 30 seconds, etc.), along with the location of the law enforcement professional and the person of interest. Thus, if the electronic communications are sent within the particular period of time (e.g., a threshold value), verification server 118 may determine that the law enforcement professional and the person of interest are at the same location at the same time.

In embodiments, verification server 118 may compare the geographic location information received in electronic communication 416 with stored geographic location information of a person of interest. In embodiments, verification server 118 may compare the received biometric information with stored biometric information. In embodiments, verification server 118 may compare the time information of electronic communication 414 with the time information of a person of interest's electronic communication sent from a person of interest's user device. In embodiments, verification server 118 may send an electronic communication (electronic communication 418) to user device 112 and another electronic communication (electronic communication 420) to server 122 based on the comparison of the received biometric, geographic, and/or time information with other biometric, geographic, and/or time information.

In embodiments, electronic communications 418 and 420 may include a confirmation message that the biometric information confirms the identity of the user, the geographic location information confirms that the user is at a person of interest's location (e.g., another person's home, place of employment, etc., and within a particular distance between the person of interest and the law enforcement professional such as within 10 feet, 20 feet, etc.), and the time of different electronic communications (e.g., communications sent within five seconds, 30 seconds, 5 minutes of each other) indicates that the law enforcement professional and the person of interest are at the same location at the same time. Alternatively, electronic communications 418 and 420 may include a non-confirmation message that the biometric information does not confirm the identity of the user; or, the geographic location information from user device 112 does not match the person of interest's geographic information. In embodiments, electronic communication 418 may provide confirmation to the law enforcement professional that verification has occurred. In embodiments, electronic communication 420 may be used by server 122 to confirm that verification has occurred.

Figure 4C:
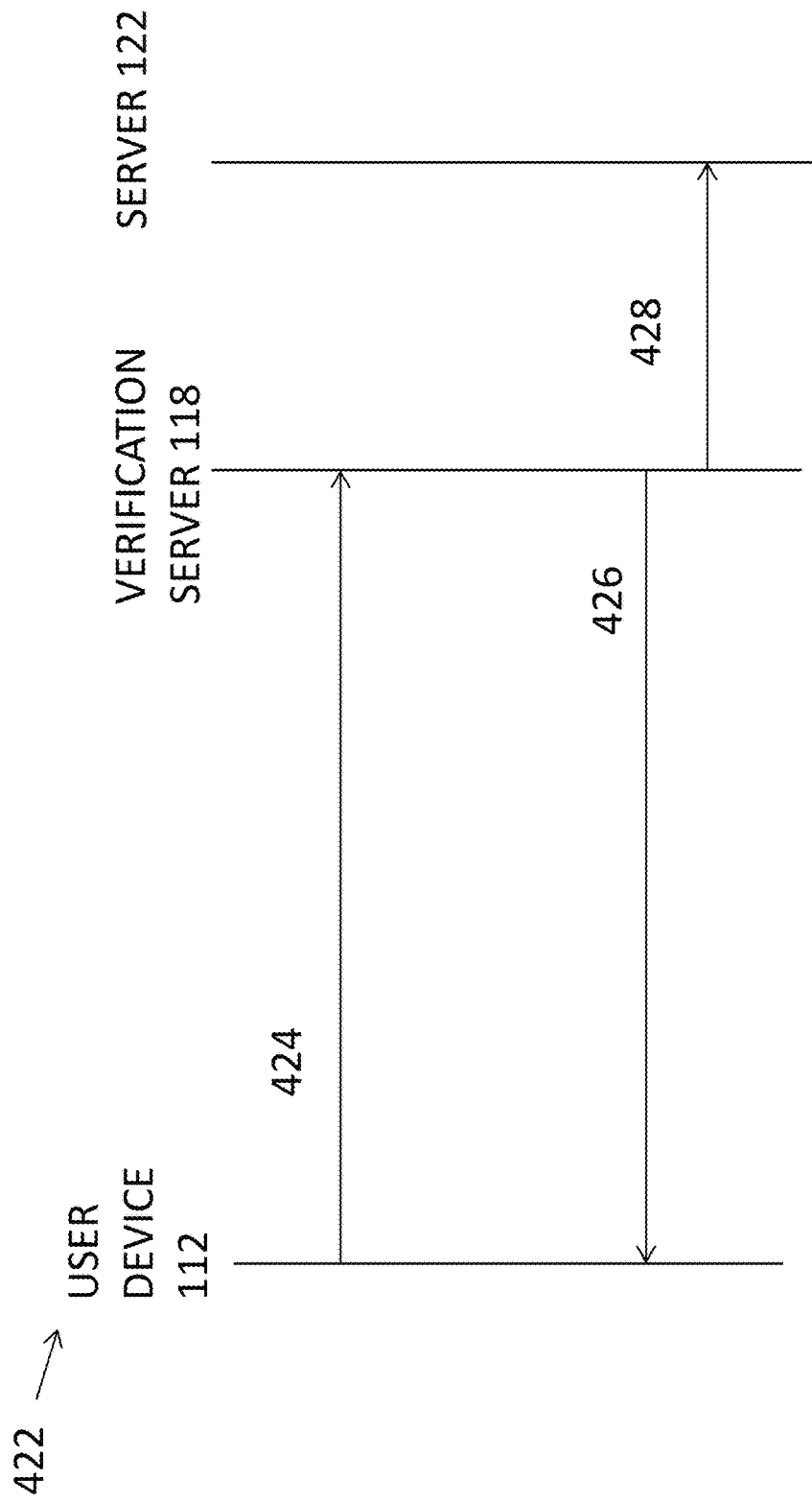

FIG. 4C describes an example communication flow process 422 for confirming a person's identity and location. As shown, FIG. 4C includes user device 112, verification server 118, and server 122. In embodiments, for FIG. 4C, a user has been registered as a law enforcement professional with electronic application 116 so that verification server 118 has biometric and other identification information about the user. In embodiments, user device 112 has electronic application 116 downloaded or one or more electronic page associated with electronic application 116. For this example communication flow process, a law enforcement professional is at a person of interest's home (or another location) and is provided some confirmation of the person of interest's identity and location at a particular time. In embodiments, the law enforcement professional has to provide verification that he/she is at the person of interest's home or another location. In embodiments, the law enforcement professional enters biometric information into user device 112 and user device 112 automatically generates electronic communication 422 which includes the law enforcement professional's biometric information and the person of interest's professional's location information (e.g., based on one or more devices with a network, such as network 110 described in FIG. 2).

In embodiments, electronic communication 424 may be received by verification server 118. In embodiments, verification server 118 compares the law enforcement professional's biometric information with stored information of the law enforcement professional and compare the location information, in electronic communication 422, with stored information about a person of interest's location (i.e., the person of interest being a different person with a different electronic identifier than the law enforcement professional's electronic identifier). In embodiments, verification server 118 also compares the time sent of electronic communication 424 with a time associated with a received electronic communication associated with the person of interest while the person of interest is at the same location as the law enforcement professional. In embodiments, if (1) the law enforcement professional's biometric information matches stored information, (2) the sent at time of electronic communication 424 matches the time of any electronic communication sent by a person of interest based on a time difference between electronic communication 424 and a person of interest's electronic communication (e.g., within 30 seconds, one minute, etc.), and/or (3) the law enforcement professional's location matches the person of interest's location (e.g., matches such as within a particular distance— 10 feet, 20 feet, etc.), then electronic communication 426 and 428 are confirmation messages. In embodiments, if the law enforcement professional's biometric information does not match stored information, the sent time of electronic communication 424 does not match, or is within a threshold of time, with a communication associated with the person of interest, or the law enforcement professional's location does not match the person of interest's location, then electronic communication 426 and 428 are messages indicating no confirmation.

In FIGS. 4A, 4B, and 4C, in embodiments, a person of interest may have sent their location information by also entering their biometric information, into user device 112 or user device 114, in a manner similar to that described in FIG. 4A, 4B, or 4C in regards to the law enforcement professional. In embodiments, the person of interest's biometric information may be associated with a time and location associated with when and where the person of interest sent their biometric information. In alternate embodiments, the person of interest may send their location during the registration process which is used to compare with the law enforcement professional's location information; and, not provide any biometric information while a law enforcement professional is confirming the person of interest's current status.

Figure 5:
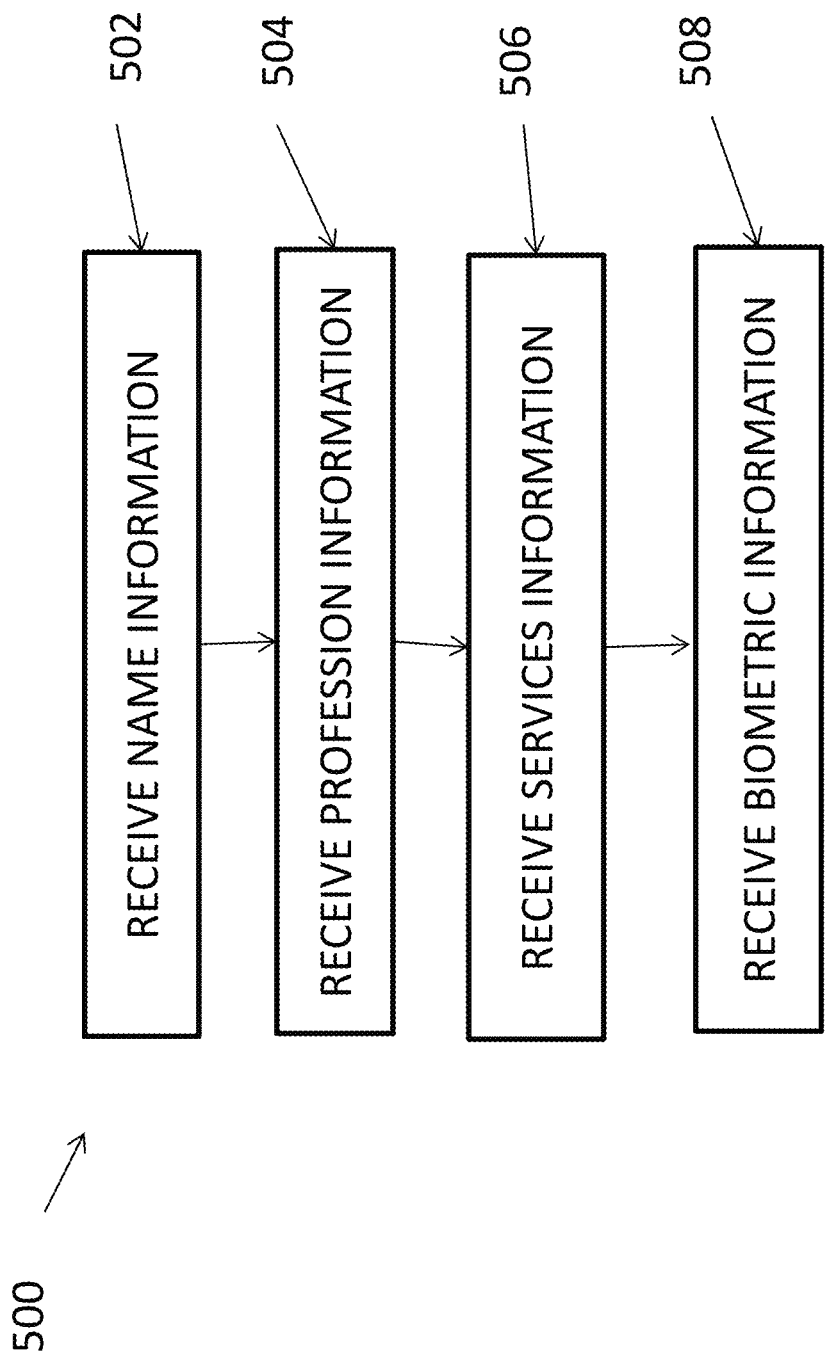
FIG. 5 is a flow chart of an example process for obtaining electronic registration information.

FIG. 5 is a flow chart of an example process 500 for obtaining information for registering a law enforcement professional with electronic application 116 and/or verification server 118. In embodiments, example process 500 may be performed by electronic application 116 and/or verification server 118 receiving electronic information from user device 112 and other computing devices, such as GPS satellite 120 and/or server 122. In embodiments, an electronic page associated with electronic application 116 is displayed on the screen of user device 112 and includes an electronic registration page and links (e.g., via icons, buttons, etc.) that, when electronically selected, allow a user to provide information to electronic application 116 or verification server 120 as described in FIG. 5.

At step 502, electronic application 116 and/or verification server 118 may receive name information. In embodiments, the name information may include a law enforcement professional's first, middle, and/or last name. At step 504, electronic application 116 and/or verification server 118 may receive profession information. In embodiments, the profession information may include law enforcement professional's occupation, such as probation officer, police officer, border patrol officer, and/or any other type of profession that confirms a person of interest's legal status. In embodiments, the professional information may include any licensure information (e.g., badge information, employee ID, etc.). At step 506, electronic application 116 and/or verification server 118 may receive information about services provided by the law enforcement professional. This may include services such as confirming legal status, physical condition, and/or other information (e.g., passport information, visa information, employment status, etc.). At step 508, electronic application 116 and/or verification server 118 may receive biometric information for the law enforcement professional.

In embodiments, the biometric information may be fingerprint information based on the user placing a finger (or thumb) onto the screen of user device 112, or based on the user placing the finger (or thumb) near (e.g., within one centimeter of the screen of user device 112) and user device 112 capturing characteristics of the fingerprint.

Alternatively, the biometric information may be retina information that is obtained by user device 112 (and electronic application 116) by placing user device 112 within a particular distance (e.g., within one feet, two feet, etc.) of the user's retina. Thus, electronic application 116 may electronically capture characteristics of the retina. Alternatively, the biometric information may be facial information that is obtained by user device 112 (and electronic application 116) by placing user device 112 within a particular distance of the user's face so that the entire user face may be electronically analyzed by electronic application 116. Alternatively, the biometric information may be voice information of the user that is obtained by user device 112 (and electronic application 116) by having the user to speak into a microphone device associated with user device 112. In embodiments, the biometric information may be a combination of different types of information, such as fingerprint, retina, facial, and/or voice information. Upon receiving the information described in FIG. 5, electronic application 116 and/or verification server 118 may generate an electronic registration and profile for the law enforcement professional.

Figure 6:
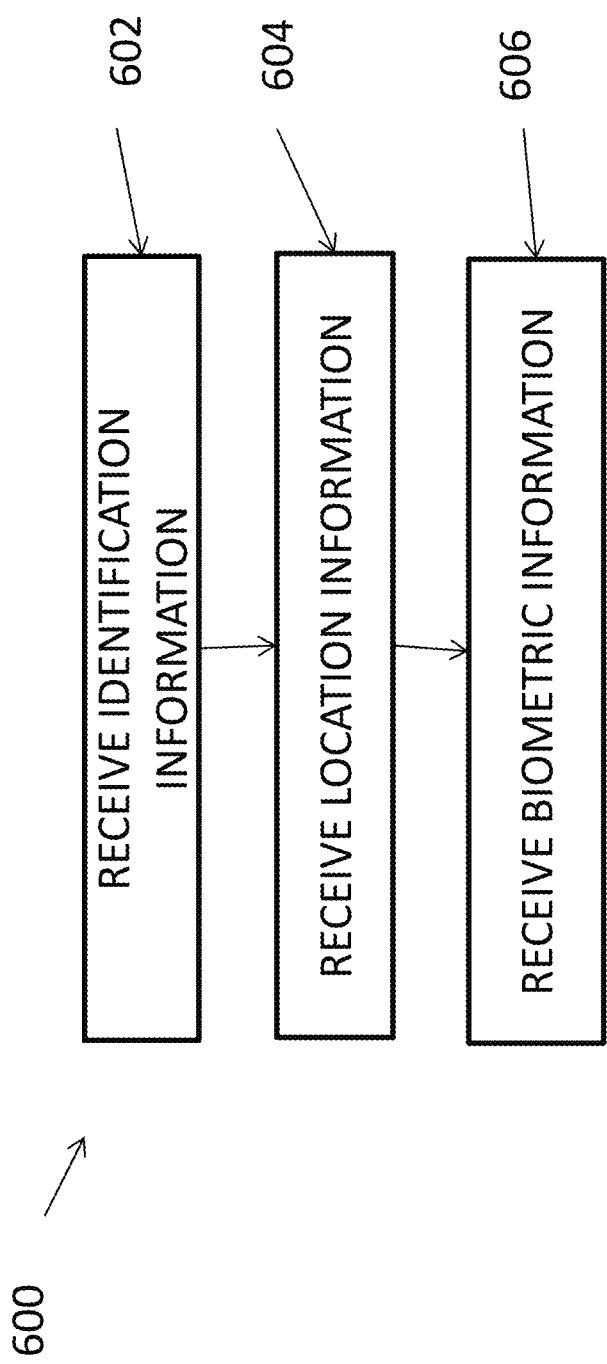
FIG. 6 is a flow chart of an example process for obtaining electronic registration information.

FIG. 6 is a flow chart of an example process 600 for receiving person of interest information. In embodiments, example process 600 may be performed by electronic application 116 and/or verification server 118 receiving electronic information from user device 112 and other computing devices, such as GPS satellite 120 and/or server 122. In embodiments, an electronic page associated with electronic application 116 is displayed on the screen of user device 112 and includes an electronic registration page and links (e.g., via icons, buttons, etc.) that, when electronically selected, allows a person of interest to provide information as described in FIG. 6. In embodiments, steps 602 to 606 may be provided by someone (via a user device, such as user device 112 or user device 114) other than a person of interest or the person of interest themselves. In embodiments, the person of interest may register, as described in FIG. 6, on a law enforcement professional's user device prior to the law enforcement professional's actual visit to the person of interest, or the person of interest may register on the law enforcement professional's user device during the law enforcement professional's actual visit.

At step 602, electronic application 116 and/or verification server 118 may receive identification information about the person of interest. In embodiments, the identification information may include the person of interest's name, age, gender, passport information, driver licensure information, and/or any other information for identifying the person of interest. At step 604, electronic application 116 and/or verification server 118 may receive location information about the person of interest. In embodiments, the location information may include street address, street name, street type, locale (e.g., village, town, city, etc.), county, state, and/or country information. In embodiments, location information may be received via a communications system as described in FIG. 1.

At step 606, electronic application 116 and/or verification server 118 may receive biometric information about the person of interest. In embodiments, the biometric information may be fingerprint information based on the user placing a finger (or thumb) onto the screen of user device 114, or based on the user placing the finger (or thumb) near (e.g., within one centimeter of the screen of user device 114) and user device 114 capturing characteristics of the fingerprint.

Alternatively, the biometric information may be retina information that is obtained by user device 114 (and electronic application 116) by placing user device 114 within a particular distance (e.g., within one feet, two feet, etc.) of the user's retina. Thus, electronic application 116 may electronically capture characteristics of the retina. Alternatively, the biometric information may be facial information that is obtained by user device 114 (and electronic application 116) by placing user device 114 within a particular distance of the user's face so that the entire user face may be electronically analyzed by electronic application 116. Alternatively, the biometric information may be voice information of the user that is obtained by user device 114 (and electronic application 116) by having the user to speak into a microphone device associated with user device 114. In embodiments, the biometric information may be a combination of different types of information, such as fingerprint, retina, facial, and/or voice information. Upon receiving the information described in FIG. 6, electronic application 116 and/or verification server 118 may generate an electronic registration and profile for the person of interest.

FIG. 7A is a flow chart of an example process 700 for receiving verifying identity and location information. In embodiments, example process 700 may be performed by electronic application 116 and/or verification server 118.

At step 702, electronic application 116 and/or verification server 118 may receive location information associated with a law enforcement professional and/or a person of interest while the law enforcement professional is at the same, or similar, location as the person of interest. In embodiments, the location information may be sent automatically by a user device (e.g., user device 112 and/or user device 114) to electronic application 116 and/or verification server 118; or, the location information may be sent based on an electronic instruction by the law enforcement professional and/or person of interest to the user device. In embodiments, the location information may include address information. In embodiments, the location information may be associated with GPS satellite 120; and, electronic application 116 and/or verification server 118 may receive, via GPS satellite 120, the location information.

At step 704, electronic application 116 and/or verification server 118 may receive biometric information associated with a law enforcement professional and/or person of interest while the law enforcement professional is at the same location as the person of interest. In embodiments, the biometric information may be fingerprint information, retina information, facial information, voice information, and/or any other biometric information. In embodiments, the person of interest and law enforcement professional may send the biometric and location information simultaneously or within a required period of time (e.g., within one minute, two minutes, etc.) from different user devices. In embodiments, the location information may be sent by using GPS technology or any other type of communications technology with a type of network as described in FIG. 2. In embodiments, electronic application 116 and/or verification server 118 may receive time information associated with the time that the biometric and location information is sent from the law enforcement professional's user device.

At step 706, electronic application 116 and/or verification server 118 may confirm the law enforcement professional and/or person of interest's biometric, time, and/or location information. In embodiments, electronic application 116 and/or verification server 118 may compare the received biometric information (e.g., in step 704) and location information (e.g., in step 702) with stored biometric and location information (e.g., as described in FIGS. 5 and 6). In embodiments, electronic application 116 and/or verification server 118 may (1) confirm the law enforcement professional's biometric information matches stored biometric information and location information matches the person of interest's location information, (2) confirm the law enforcement professional's biometric information matches the stored biometric information, but the law enforcement professional's location information does not match the person of interest's location information, (3) confirm the law enforcement profession's location information matches the person of interest's location information, but the law enforcement professional's biometric information does not match the stored biometric information with an identifier associated with the law enforcement professional, or (4) or no confirmation the law enforcement profession's location information or the law enforcement profession's biometric information. In embodiments, electronic application 116 and/or verification server 118 may (1) confirm the person of interest's biometric matches the stored biometric information, or (2) not confirm the person of interest's biometric matches the stored biometric person of interest. Additionally, electronic application 116 and/or verification server 118 may confirm that the person of interest and the law enforcement professional are at the same location at the same time based on a time difference (e.g., within five seconds, 30 seconds, one minute, etc.) between the time sent for an electronic communication (including the law enforcement professional's biometric and/or location information) from a law enforcement professional's user device with the time for an electronic communication (including the person of interest's biometric and/or location information) sent from a person of interest's user device.

At step 708, electronic application 116 and/or verification server 118 may send electronic communications based on confirming or not confirming a law enforcement professional's or person of interest's biometric and/or location information. In embodiments, the electronic communications may include information that biometric and/or location information has or has not been confirmed. In embodiments, the electronic communications may be sent to other user devices (e.g., user device 112 or 114) and other computing devices (e.g., server 122). In embodiments, a confirmation message may only be sent when biometric information is matched for both the person of interest and the law enforcement professional with stored biometric information; and, the person of interest and law enforcement professional's location match or are within a particular distance (e.g., within 100 feet, 500 feet, 1,000 feet, etc. of each other based on information sent from one or more user devices). In embodiments, other computing devices may use the confirmation (or non-confirmation) information to determine whether to electronically send additional electronic communications that may include electronic tokens. For example, based on confirmation of the person of interest, the additional electronic communications may send electronic tokens to an electronic account of the person of interest (e.g., on a weekly, monthly, daily, etc., basis).

Figure 7B:
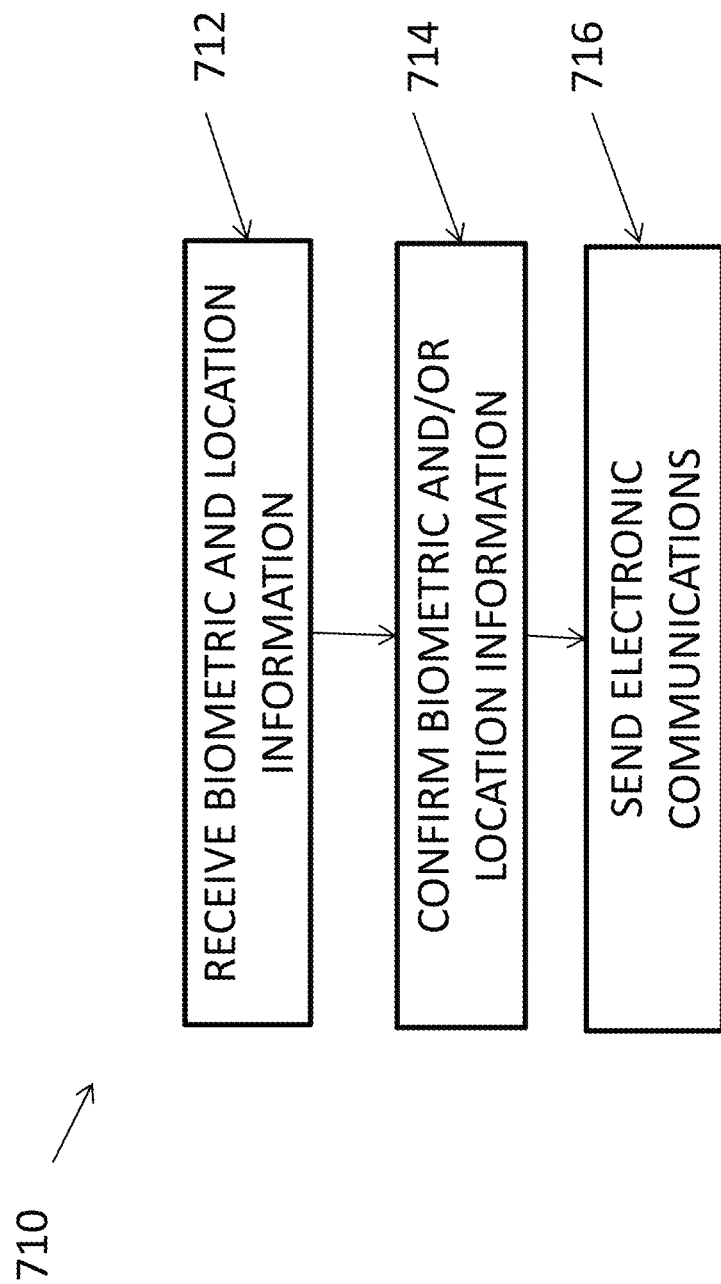

FIG. 7B is a flow chart of an example process 710 for receiving verifying identity and location information. In embodiments, example process 710 may be performed by electronic application 116 and/or verification server 118.

At step 712, electronic application 116 and/or verification server 118 may receive biometric and location information associated with a law enforcement professional and/or a person of interest while the law enforcement professional is at the same, or similar, location as the person of interest. In embodiments, the biometric and location information may be sent automatically by a user device (e.g., user device 112 and/or user device 114) to electronic application 116 and/or verification server 118. For example, the law enforcement professional may send his/her location and biometric information upon entering his/her biometric information into a user device (e.g., user device 112). The person of interest may send his/her location and biometric information upon entering his/her biometric information into the same user device (e.g., user device 112) or another user device (e.g. user device 114). In embodiments, the person of interest and law enforcement professional may send their respective information simultaneously or within a required period of time (e.g., within one minute, two minutes, etc.) from different user devices. In embodiments, the location information may be sent by using GPS technology or any other type of communications technology with a type of network as described in FIG. 2. In embodiments, electronic application 116 and/or verification server 118 may receive a sent time of the electronic communication that includes the law enforcement professional's location and biometric information; and, electronic application 116 and/or verification server 118 may receive a sent time (from the user device) of the electronic communication that includes the person of interest's location and biometric information.

At step 714, electronic application 116 and/or verification server 118 may confirm the law enforcement professional and/or person of interest's biometric, time, and/or location information. In embodiments, electronic application 116 and/or verification server 118 may compare the received biometric information and location information (e.g., step 712) with stored biometric and location information (e.g., as described in FIGS. 5 and 6). In embodiments, electronic application 116 and/or verification server 118 may (1) confirm the law enforcement professional's biometric information matches stored biometric information and location information matches the person of interest's location information, (2) confirm the law enforcement professional's biometric information matches the stored biometric information, but the law enforcement professional's location information does not match the person of interest's location information, (3) confirm the law enforcement profession's location information matches the person of interest's location information, but the law enforcement professional's biometric information does not match the stored biometric information with an identifier associated with the law enforcement professional, or (4) or no confirmation of the law enforcement profession's location information or the law enforcement profession's biometric information. In embodiments, electronic application 116 and/or verification server 118 may (1) confirm the person of interest's biometric matches the stored biometric information, or (2) not confirm the person of interest's biometric matches the stored biometric information. Additionally, electronic application 116 and/or verification server 118 may confirm the person of interest's and/or law enforcement professional's identity and that the person of interest and the law enforcement professional are at the same location at the same, or similar, time based on a time difference (e.g., within five seconds, 30 seconds, one minute, etc.) between the time for an electronic communication (including the law enforcement professional's biometric and location information) sent from a law enforcement professional's user device and the time sent for an electronic communication (including the person of interest's biometric and location information) from a person of interest's user device.

At step 716, electronic application 116 and/or verification server 118 may send electronic communications based on confirming or not confirming a law enforcement professional's or person of interest's biometric, time, and/or location information. In embodiments, the electronic communications may include information that biometric, time, and/or location information has or has not been confirmed. In embodiments, the electronic communications may be sent to other user devices (e.g., user device 112 or 114) and other computing devices (e.g., server 122). In embodiments, a confirmation message may only be sent when biometric information is matched for both the person of interest and the law enforcement professional with stored biometric information; the person of interest and law enforcement professional's location match or are within a particular distance (e.g., 10 feet, 50 feet, 100 feet, etc., between the person of interest's location and the law enforcement professional's location); and/or, the person of interest and the law enforcement professional are determined to be at the same location at the same or similar time (e.g., based on communications that are received within a particular period of time, i.e., within a threshold amount of time). In embodiments, other computing devices may use the confirmation (or non-confirmation) information to determine whether to electronically send additional electronic communications that may include electronic tokens. For example, based on confirmation of the person of interest, the additional electronic communications may send electronic tokens to an electronic account of the person of interest (e.g., on a weekly, monthly, daily, etc., basis).

FIG. 7C is a flow chart of an example process 718 for receiving verifying identity and location information. In embodiments, example process 718 may be performed by electronic application 116 and/or verification server 118.

At step 720, electronic application 116 and/or verification server 118 may receive biometric and location information associated with a person of interest. In embodiments, the biometric and location information may be sent automatically by a user device (e.g., user device 112 and/or user device 114) to electronic application 116 and/or verification server 118. For example, the person of interest may send his/her location and biometric information upon entering his/her biometric information into the same user device (e.g., user device 112) or another user device (e.g. user device 114). In embodiments, the location information may be sent by using GPS technology or any other type of communications technology with a type of network as described in FIG. 2. In embodiments, electronic application 116 and/or verification server 118 may receive a sent time (from the user device) of the electronic communication that includes the person of interest's location and biometric information.

At step 722, electronic application 116 and/or verification server 118 may confirm the person of interest's biometric, time, and/or location information. In embodiments, electronic application 116 and/or verification server 118 may compare the received biometric information and location information (e.g., step 712) with stored biometric and location information (e.g., as described in FIGS. 5 and 6). In embodiments, electronic application 116 and/or verification server 118 may (1) confirm the person of interest's biometric matches the stored biometric information, or (2) not confirm the person of interest's biometric matches the stored biometric information. Additionally, electronic application 116 and/or verification server 118 may confirm the person of interest's and/or law enforcement professional's identity and that the person of interest are at a particular location at a particular time.

At step 724, electronic application 116 and/or verification server 118 may send electronic communications based on confirming or not confirming a person of interest's biometric, time, and/or location information. In embodiments, the electronic communications may include information that biometric, time, and/or location information has or has not been confirmed. In embodiments, the electronic communications may be sent to other user devices (e.g., user device 112 or 114) and other computing devices (e.g., server 122). In embodiments, a confirmation message may only be sent when biometric information is matched for the person of interest with stored biometric information; and/or, the person of interest is determined to be at a location at a particular time (e.g., based on communications that are received within a particular period of time, i.e., within a threshold amount of time). In embodiments, other computing devices may use the confirmation (or non-confirmation) information to determine whether to electronically send additional electronic communications that may include electronic tokens. For example, based on confirmation of the person of interest, the additional electronic communications may send electronic tokens to an electronic account of the person of interest (e.g., on a weekly, monthly, daily, etc., basis).

Figure 8:
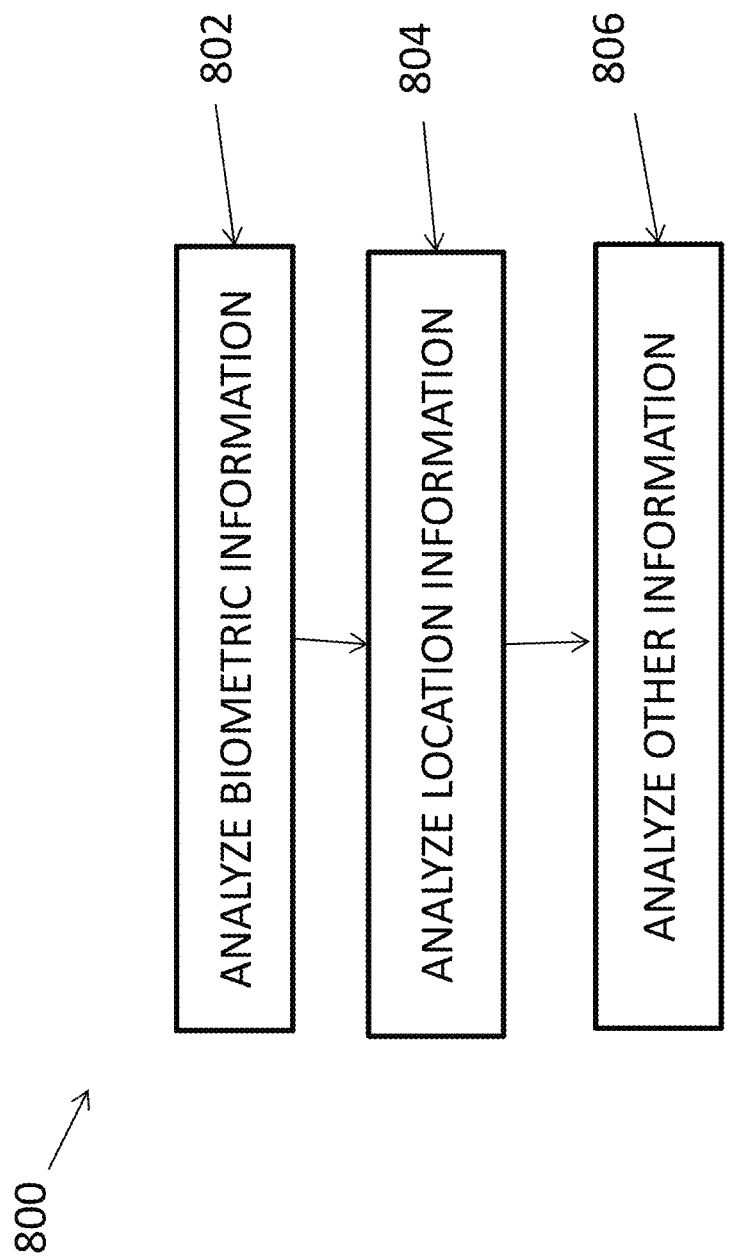
FIG. 8 is a flow chart of an example process for analyzing electronic information.

FIG. 8 is a flow chart of an example process 800 for receiving verifying identity and location information. In embodiments, example process 800 may be performed by electronic application 116 and/or verification server 118. In embodiments, example process 800 may further describe processes, methods, and systems for analyzing biometric and location information.

At step 802, electronic application 116 and/or verification server 118 may analyze biometric information. In embodiments, if the biometric information includes fingerprint information, electronic application 116 and/or verification server 118 may analyze curves and patterns in the fingerprint information of a law enforcement professional and/or person of interest. In embodiments, the fingerprint information is received during a visit by a law enforcement professional at a person of interest's geographic location. In embodiments, the fingerprint information is then compared to fingerprint information received during a registration procedure for a law enforcement professional or person of interest (e.g., as described in FIGS. 5 and 6).

Alternatively, if the biometric information includes retina information, electronic application 116 and/or verification server 118 may analyze shape, color, and/or other retina features of a law enforcement professional and/or person of interest. In embodiments, the retina information is received during a visit by a law enforcement professional at a person of interest's geographic location. In embodiments, the retina information is then compared to retina information received during a registration procedure for a law enforcement professional or person of interest (e.g., as described in FIGS. 5 and 6).

Alternatively, if the biometric information includes facial information, electronic application 116 and/or verification server 118 may analyze facial features (e.g., size of forehead, lips, cheek structure, eyebrows, facial hair, etc.) of a law enforcement professional and/or a person of interest. In embodiments, the facial information is received during a visit by a law enforcement professional at a person of interest's geographic location. In embodiments, the facial information is then compared to facial information received during the registration procedure for a law enforcement professional or person of interest (e.g., as described in FIGS. 5 and 6).

At step 804, electronic application 116 and/or verification server 118 may analyze current location information for a law enforcement professional and/or a person of interest. In embodiments, the location information is received during a visit by a law enforcement professional at a person of interest's geographic location. In embodiments, the location information is compared to location information received during the registration procedure for a law enforcement professional or person of interest (e.g., as described in FIGS. 5 and 6).

At step 806, electronic application 116 and/or verification server 118 may analyze other information associated with confirming legal status information of a person of interest. In embodiments, the other information may be information associated with confirming legal documentation, such as passport information, employment information, etc.

FIG. 9 describes an example data structure 900 that stores one or more person's biometric and location information during a registration process. In embodiments, data structure 900 may include a collection of fields such as ID 902, Biometric 904, and Location 906. Although FIG. 9 shows example fields 902 to 906, in other embodiments, data structure 900 may include fewer fields, different fields, additional fields, and/or differently arranged fields than depicted in FIG. 9. In embodiments, each field may include sub-fields. In embodiments, verification server 118 may store some or all of data structure 900. Additionally, or alternatively, user device 112 or user device 114 may store some or all of data structure 900.

In embodiments, ID 902 may include an identifier for a law enforcement professional or a person of interest. In embodiments, Biometric 904 may include biometric information that is received during a registration process (e.g., as described in FIGS. 5 and 6). In embodiments, Location 906 may include location information that is received during a registration process (e.g., as described in FIG. 6). In embodiments, Biometric 904 and/or Location 906 may also include time information associated with when a particular electronic communication (including Biometric 904 and/or Location 906) is sent from a user device.

FIG. 10 describes an example data structure 1000 that stores one or more factors that are received about one or more person's biometric and location information during a visit by a law enforcement professional at a person of interest's geographic location. In embodiments, data structure 1000 may include a collection of fields such as ID 1002, Biometric 1004, Location 1006, and Confirm 1008. Although FIG. 10 shows example fields 1002 to 1008, in other embodiments, data structure 1000 may include fewer fields, different fields, additional fields, and/or differently arranged fields than depicted in FIG. 10. In embodiments, each field may include sub-fields. In embodiments, verification server 118 may store some or all of data structure 1000. Additionally, or alternatively, user device 112 or user device 114 may store some or all of data structure 1000.

In embodiments, ID 1002 may include identification information (name, pseudonym, etc.) of a law enforcement professional or a person of interest. In embodiments, information in ID 1002 may be received from field 902 in data structure 900 (described in FIG. 9). In embodiments, Biometric 1004 may be biometric information received from a law enforcement professional and/or a person of interest during a law enforcement professional's visit to a person of interest's home or other location. In embodiments, Location 1006 may be location information received from a law enforcement professional and/or a person of interest during a law enforcement professional's visit to a person of interest's home or other location. In embodiments, Confirm 1008 may store confirmation or no confirmation based on (1) comparing information in Biometric 1004 with Biometric 904 (described in FIG. 9), (2) comparing information in Location 1006 with Location 906 (described in FIG. 9) to confirm that a law enforcement professional is at the same or similar geographic location as the person of interest and is providing a service to a person of interest, and/or (3) comparing time information associated with a communication, including Biometric 904 and/or Location 906, sent from a law enforcement professional's user device with the time information associated with a communication from a person of interest's user device that includes the person of interest's biometric and location information.

FIG. 11 describes an example data structure 1100 that stores confirmation information associated with a visit by a law enforcement professional at a person of interest's geographic location. In embodiments, data structure 1100 may include a collection of fields such as ID 1102, Confirm 1104, Status 1106, and Other 1108. Although FIG. 11 shows example fields 1102 to 1108, in other embodiments, data structure 1000 may include fewer fields, different fields, additional fields, and/or differently arranged fields than depicted in FIG. 11. In embodiments, each field may include sub-fields. In embodiments, verification server 118 may store some or all of data structure 1100. Additionally, or alternatively, user device 112 or user device 114 may store some or all of data structure 1100.

In embodiments, ID 1102 may include identifier information about a patient and may be received from ID 9002 as described in FIG. 9. In embodiments, Confirm 1104 may include confirmation information that may be received from Confirm 1008 as described in FIG. 10. In embodiments, Status 1106 may include information about a person's immigration status (e.g., information about their visa, passport, etc.) that is analyzed by a law enforcement professional and confirmed by electronic application 116 and/or verification server 118. In embodiments, Other 1108 may be information about other individuals residing with the person of interest, the condition of the property, information regarding any non-legal activities, etc.

Figure 12:
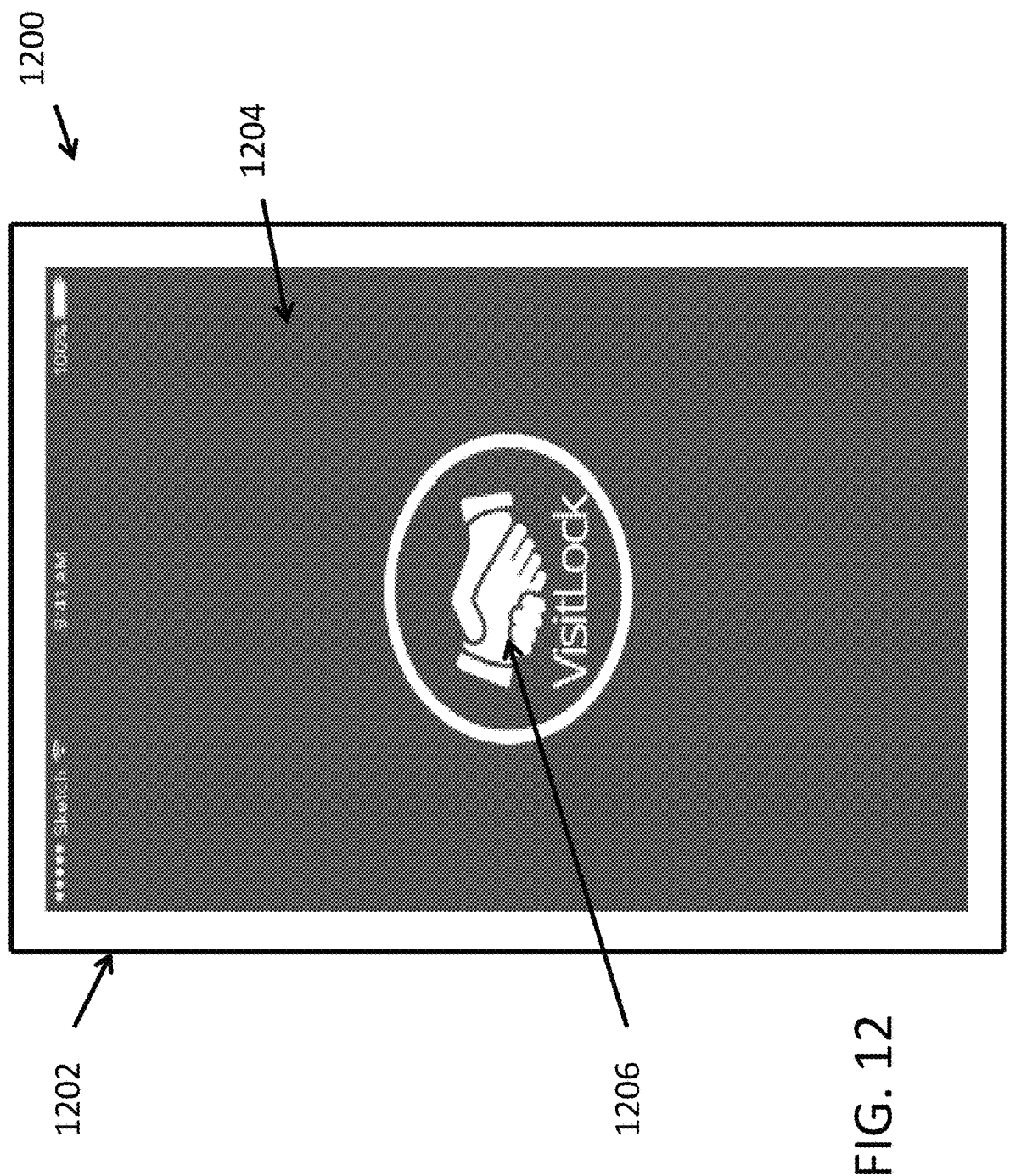
FIG. 12 is an example electronic screenshot.

FIG. 12 is an example display 1200 of an electronic welcome page associated with electronic application 116. As shown, FIG. 12 includes user device 1202, welcome page 1204, and logo 1206. In embodiments, user device 1202 may be similar to user device 112 and/or user device 114. In embodiments, welcome page 1204 may be an electronic page associated with electronic application 116 and may be electronically displayed by user device 1202 when a website address is entered or an icon displayed on user device 1202 is selected. In embodiments, logo 1206 may be a logo that is displayed on welcome page 1204 and indicates to someone that they have selected electronic application 116.

Figure 13A:
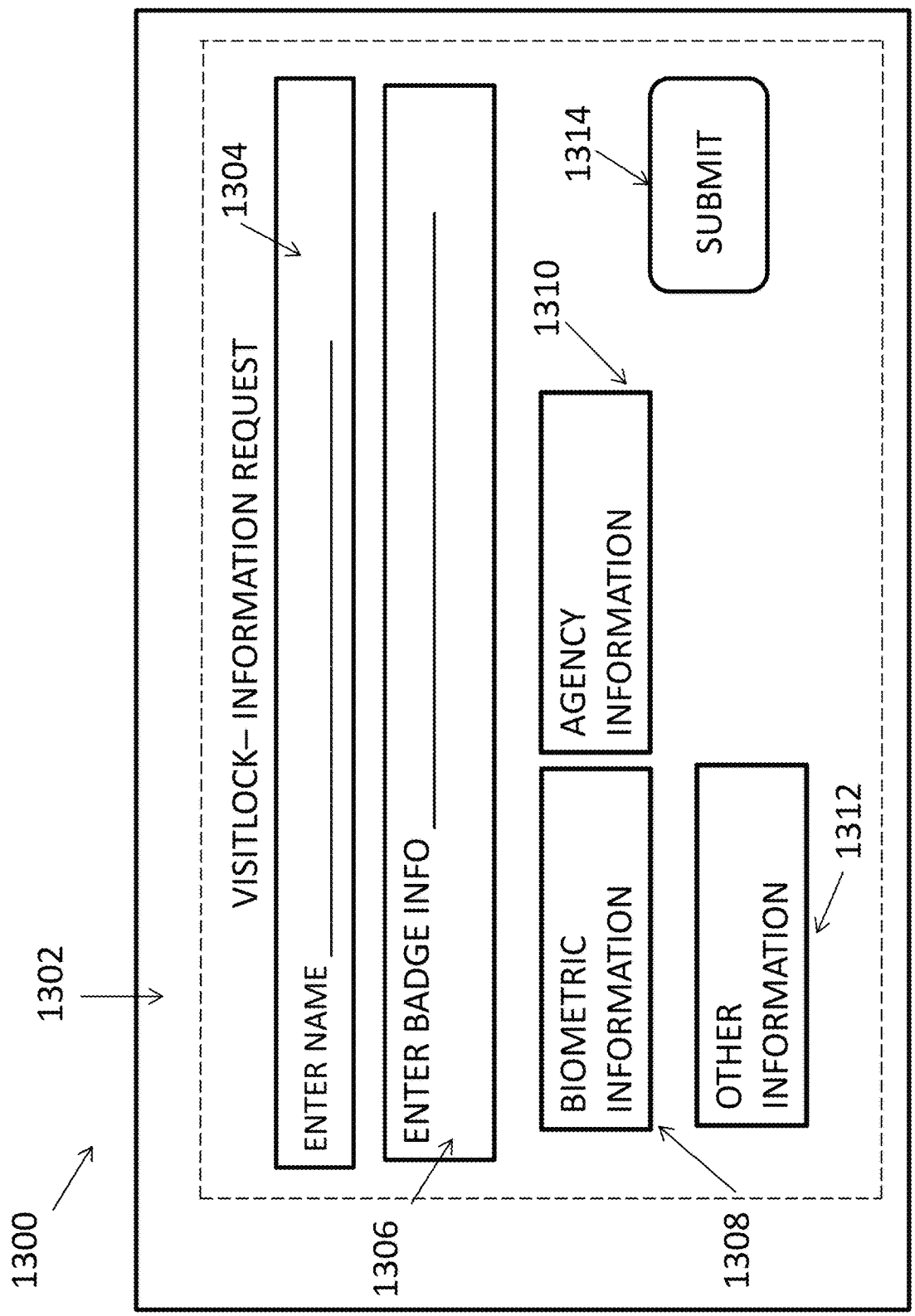
FIGS. 13A and 13B are example electronic registration forms.

FIG. 13A is an example electronic display 1300 of an electronic registration page, for a law enforcement professional, and is associated with electronic application 116. As shown, FIG. 13A includes registration page 1302, name input 1304, badge information input 1306, biometric information input 1308, agency information input 1310, other information input 1312, and submit 1314. As shown in FIG. 13A, registration page 1302 is an electronic page associated with electronic application 116 and is selected based on a request (e.g., selection of an icon, button, etc.) by a user of a user device (e.g., user device 113). In embodiments, registration page 1302 may be electronically displayed on a screen of the user device.

In embodiments, name input 1304 allows a user (e.g., a law enforcement professional) to enter name information. Additionally, name input 1304 may provide additional information such as gender, age, and/or other information. In embodiments, badge information input 1306 may allow the user to enter the law enforcement professional's badge or identifier information. In embodiments, biometric information 1308 may allow the user to enter biometric information. In embodiments, the biometric information may be fingerprint information, retina information, facial information, voice information, and/or any other type of biometric information.

In embodiments, agency information 1310 may include information about a government agency associated with the law enforcement professional. In embodiments, other information 1312 may be other information that can be inputted and associated with a registration. In embodiments, other information 1312 may include other types of information, such as health information, social security information, and/or nationality information. In embodiments, submit 1314 may be an electronic button that, when selected, creates a registration profile and/or sends electronic information for storage regarding a law enforcement professional.

Figure 13B:
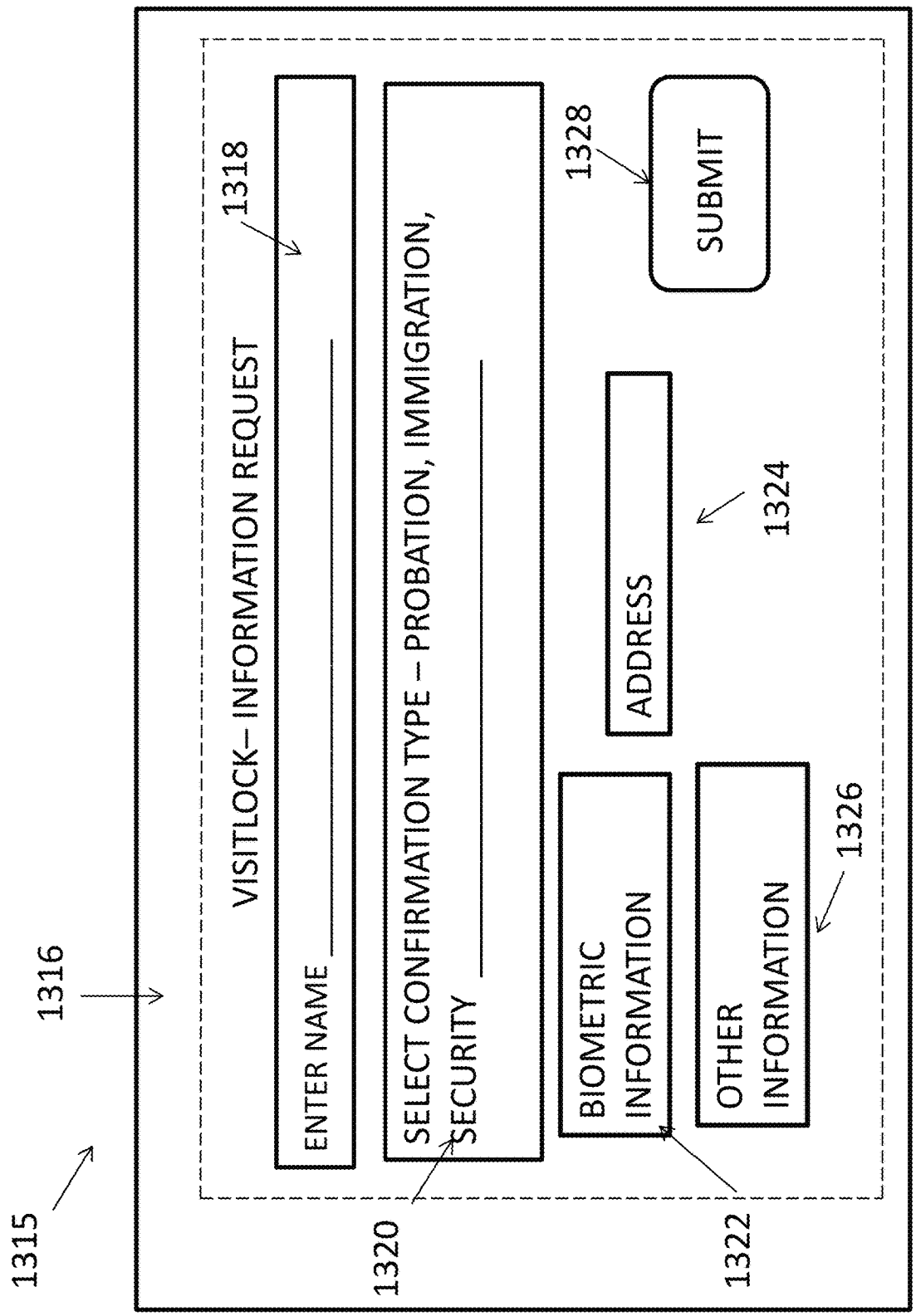

FIG. 13B is an example electronic display 1315 of an electronic registration page, for a law enforcement professional, and is associated with electronic application 116. As shown, FIG. 13B includes registration page 1316, name input 1318, confirmation type input 1320, biometric information input 1322, address input 1324, other information input 1326, and submit 1328. As shown in FIG. 13B, registration page 1316 is an electronic page associated with electronic application 116 and is selected based on a request (e.g., selection of an icon, button, etc.) by a user of a user device (e.g., user device 113). In embodiments, registration page 1316 may be electronically displayed on a screen of the user device.

In embodiments, name input 1318 allows a user (e.g., a law enforcement professional) to enter name information. Additionally, name input 1318 may provide additional information such as gender, age, and/or other information. In embodiments, confirmation type input 1320 may allow the user to enter the type of confirmation being conducted, such as confirmation relating to probation, immigration, or another issue. In embodiments, biometric information 1322 may allow the user to enter biometric information. In embodiments, the biometric information may be fingerprint information, retina information, facial information, voice information, and/or any other type of biometric information.

In embodiments, address input 1324 may include address information for a person of interest who is to be confirmed based on their home or other location. In embodiments, address input 1324 may allow for multiple addresses to be entered (e.g., street address, street name, street type, locale, county, state, country, etc.). In embodiments, other information input 1326 may include other information associated with the person of interest. In embodiments, other information may include information about the person's immigration status, any prior arrests, warrants, or other issues. In embodiments, submit 1328 may be an electronic button that, when selected, creates a registration profile and/or sends electronic information for storage for a law enforcement professional.

Figure 14:
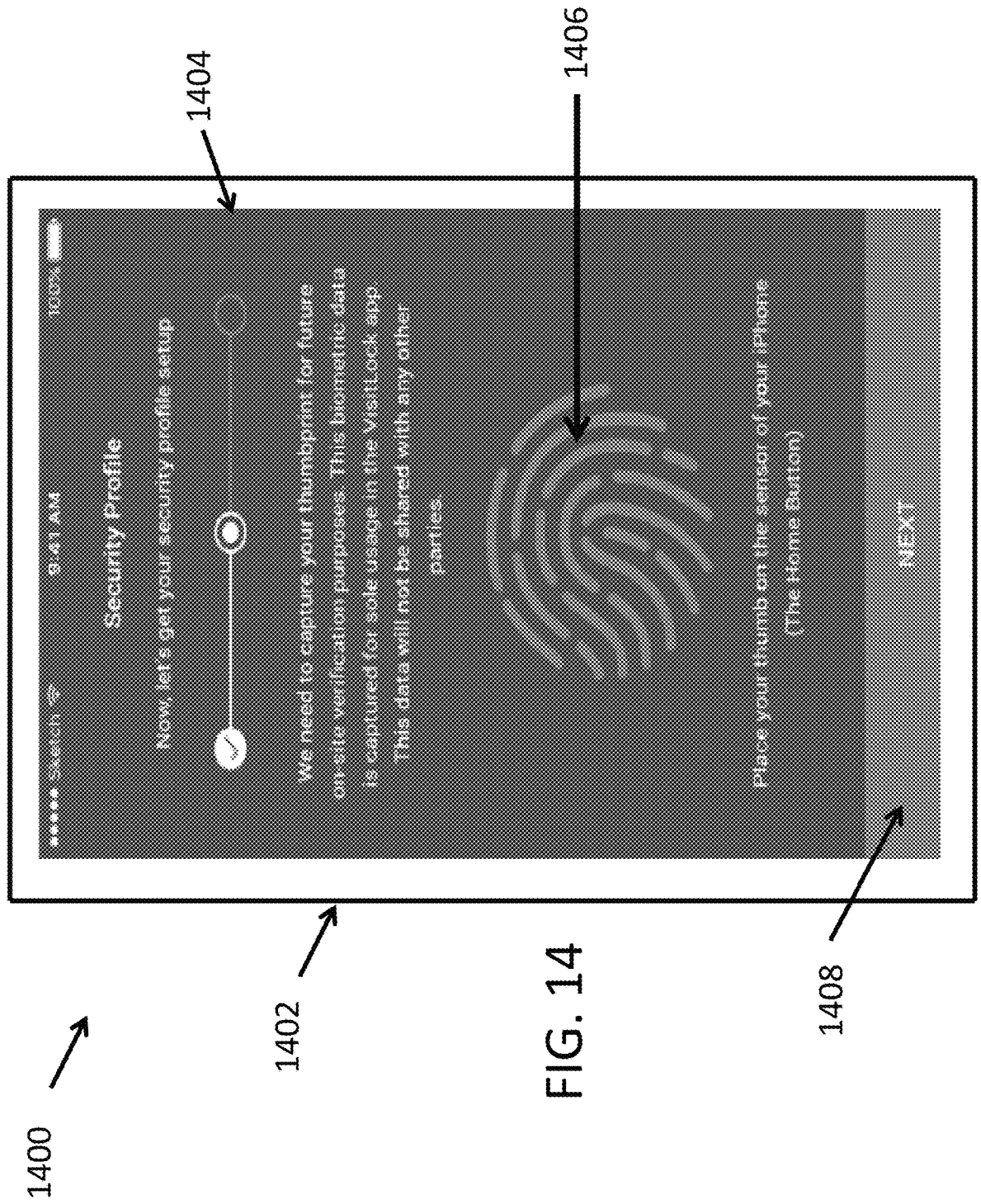
FIG. 14 is an example electronic input form.

FIG. 14 is a display of an example registration page 1400. As shown, FIG. 14 shows a user device 1402, setup page 1404, fingerprint input area 1406, and next button 1408. In embodiments, setup page 1404 (associated with electronic application 116) may allow for a law enforcement professional to provide fingerprint biometric information. In embodiments, fingerprint input area 1406 may receive fingerprint information based on a user pressing a finger or thumb onto the screen of user device 1402 or within close proximity (e.g., within one centime, two centimeters, etc.) to the screen of user device 1402. In embodiments, next button 1408 may be an electronic button that, when selected (e.g., touching, swiping, etc.) causes a different electronic page (associated with electronic application 116) to be displayed on user device 1402.

Figure 15:
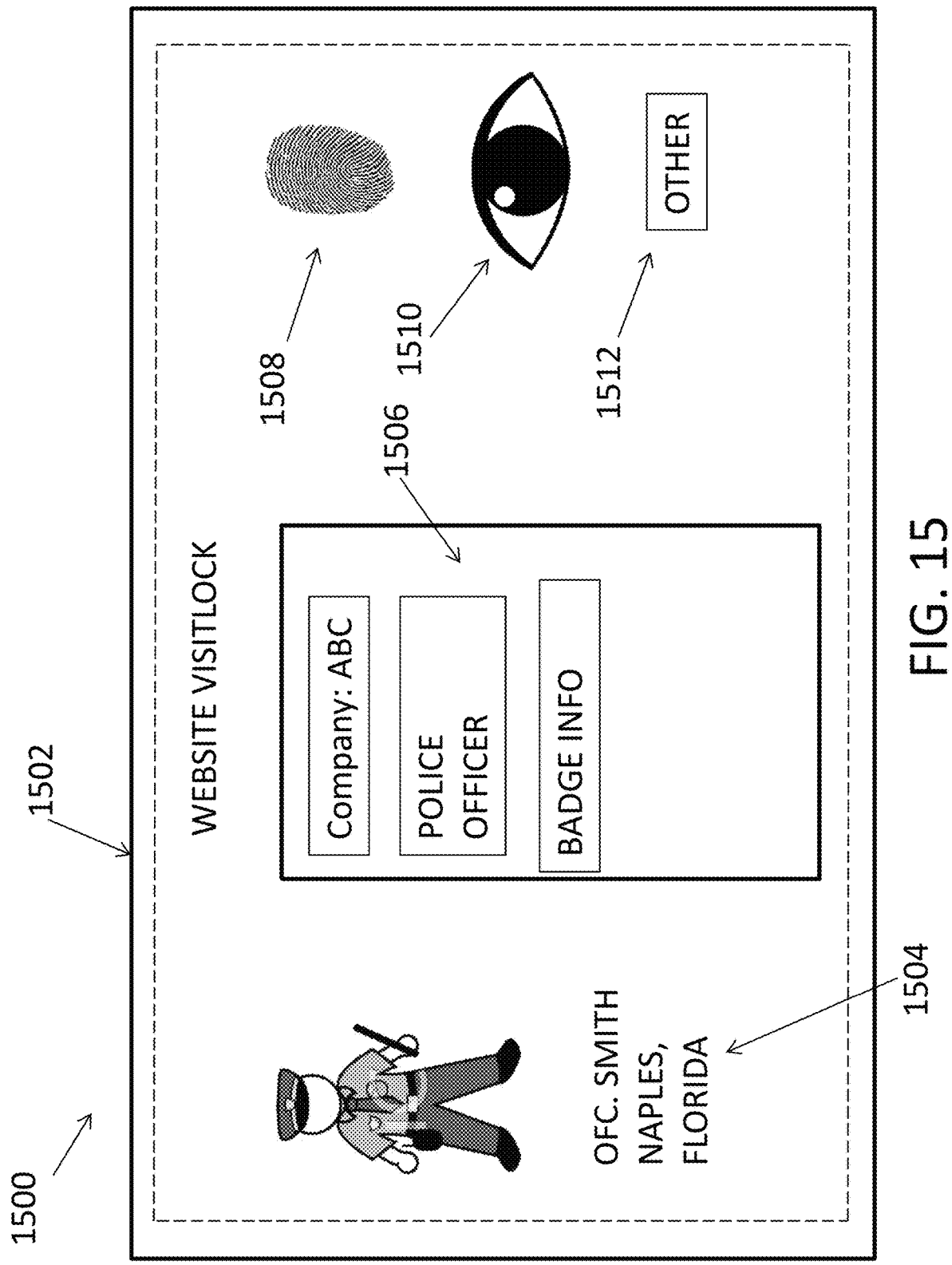
FIG. 15 is an example electronic screenshot.

FIG. 15 is an example screenshot 1500 that shows information about a registered law enforcement professional with electronic application 116 and/or verification server 118. FIG. 15 shows screen shot 1502, identity 1504, professional information 1506, fingerprint information 1508, retina information 1510, and other biometric information 1512. While FIG. 15 shows a particular display, example screenshot 1500 may have a different design with additional or fewer types of information.

In embodiments, screen shot 1502 may be of a registered law enforcement professional who has registered with electronic application 116 and based on processes as described in other figures, such as FIG. 5. In embodiments, identity 1504 may describe a name and location of a registered law enforcement professional. In embodiments, professional information 1506 may include a company for whom the law enforcement professional is employed by, the occupation of the law enforcement professional, and badge information of the law enforcement professional. In embodiments, fingerprint logo 1508 may indicate, when selected, fingerprint information provided by the law enforcement professional. In embodiments, retina logo 1510 may, when selected, include retina information provided by the law enforcement professional. In embodiments, other biometric logo 1512 may, when selected, include other types of biometric information such as facial information or voice information. In embodiments, fingerprint logo 1508, retina logo 1510, or other biometric logo 1512 may include no information; however, at least one of 1508, 1510, and 1512 require biometric information.

Figure 16:
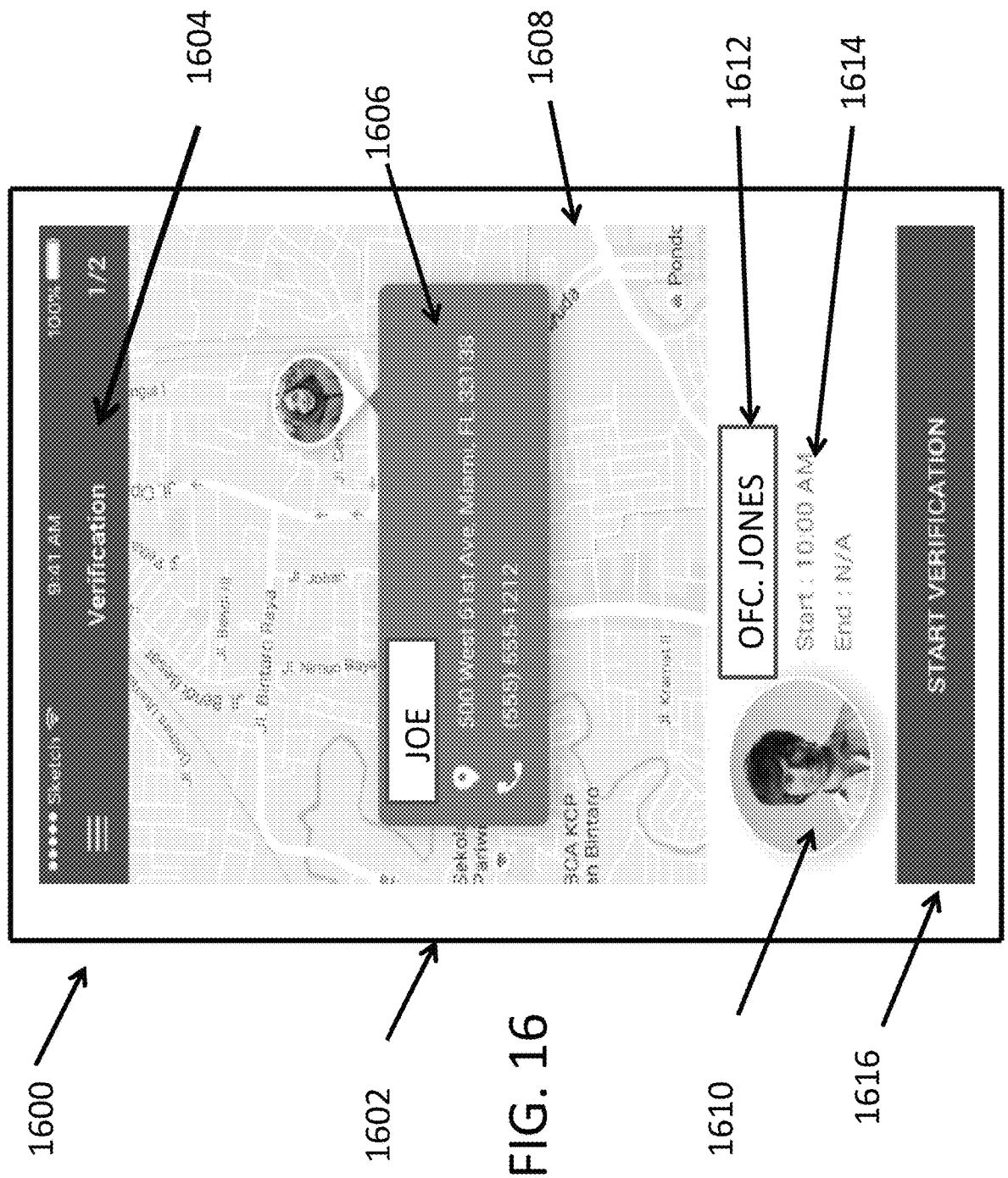
FIGS. 16 and 17 are example electronic verification forms.

FIG. 16 is an example screen shot 1600 of a verification page 1602 that is electronically displayed by a user device, such as user device 112, and is associated with electronic application 116. As shown, FIG. 16 shows verification header 1604, address information 1606, map 1608, image 1610, identifier 1612, time 1614, and verification button 1616. While FIG. 16 shows a particular display, example screenshot 1600 may have a different design with additional or fewer types of information.

In embodiments, verification header 1604 may include electronic information that informs a user that verification page 1602 is being displayed. In embodiments, address information 1606 may describe the address of a person of interest ("Jane Doe" at "500 West 61$^{st}$ Avenue, Miami 33138"), image, and phone number of the person of interest.

In embodiments, address information 1606 may be automatically displayed when user device 112 is within a particular area near or at the person of interest's address based on stored information in verification server 118 that is sent to user device 112 when verification server 118 determines the law enforcement professional's appointment is at a particular time. For example, Officer Thompson may have a 3:00 p.m. appointment with Joe. At a particular time (e.g., 2:30 p.m., 2:45 p.m., 3:00 p.m., or after 3:00 p.m.), verification server 118 may send the address information 1606 to Officer Smith's user device for electronic display. In embodiments, address information 1606 may be displayed based on electronic information sent from the person of interest to verification server 118 which may then be displayed on the user device. In alternate embodiments, address information 1606 may be displayed based on when the law enforcement professional sends electronic information with their location, automatically or based on the law enforcement professional's electronic commands to the user device, and verification server 118 electronically sends information to display the person of interest's (Jane) location on the electronic map for display on user device 112.

In embodiments, address information 1606 may be electronically displayed by a law enforcement professional selecting a button, icon, or other electronic feature. In embodiments, address information 1606 may be entered via keyboard or other processes (e.g., voice) for display on user device 112.

In embodiments, map 1608 may be a map that is electronically displayed within electronic application 116. In embodiments, image 610 may be an image of a law enforcement professional that is confirming a person of interest associated with address information 1606. In embodiments, identifier 1612 may include a name for the law enforcement professional and associated with image 1610. In embodiments, time 1614 may indicate the time associated with when the law enforcement professional is at the address described in address information 1606 which is used to determine that the law enforcement professional was at the same location at the same time as the person of interest. In embodiments, verification button 1616 may, when selected, begins a verification process which may require the law enforcement professional to provide additional information such as biometric information. In embodiments, verification page 1602 may also be used at the end of a law enforcement professional's visit with a person of interest by again inputting biometric information. Thus, a time period is determined based on inputting biometric information at the beginning and end of a visit. In embodiments, the biometric information at the end of the visit may also provide the law enforcement professional's location information.

Figure 17:
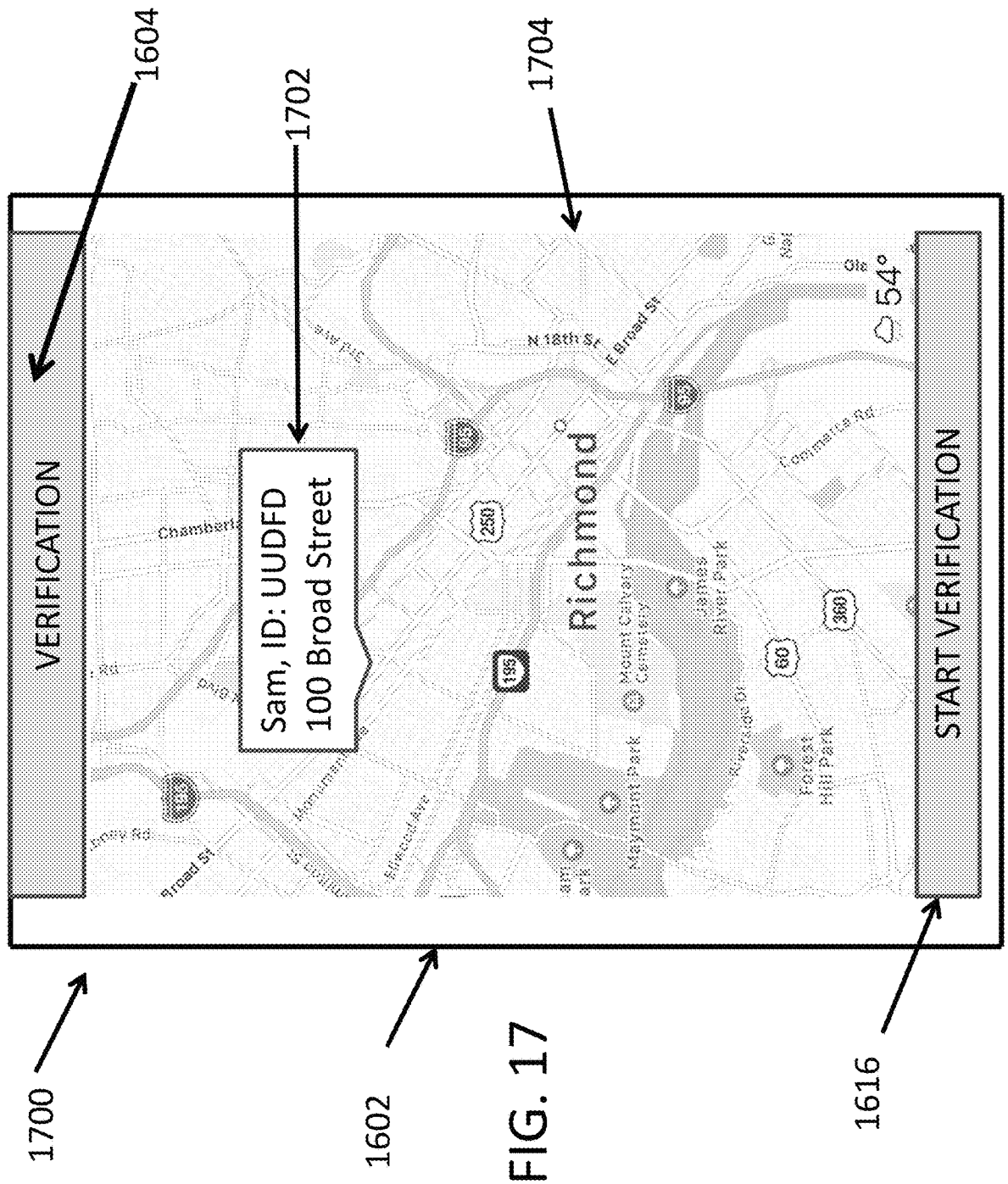

FIG. 17 is an example screen shot 1700 of a verification page 1702 that is electronically displayed by a user device, such as user device 112, and is associated with electronic application 116. As shown, FIG. 17 shows verification header 1604, identity and address information 1702, map 1704, and verification button 1616. While FIG. 17 shows a particular display, example screenshot 1700 may have a different design with additional or fewer types of information. In embodiments, verification header 1604 may include electronic information that informs a user that verification page 1602 is being displayed. In embodiments, address information 1606 may describe the address of a person of interest ("Sam" at "100 Broad Street"), and ID associated with the person of interest.

In embodiments, map 1704 may be a map that is electronically displayed within electronic application 116. In embodiments, verification button 1616 may, when selected, begins a verification process which may require the person of interest professional to provide additional information such as biometric information. In embodiments, the biometric information at the end of the visit may also provide confirmation of the person of interest's location.

Figure 18:
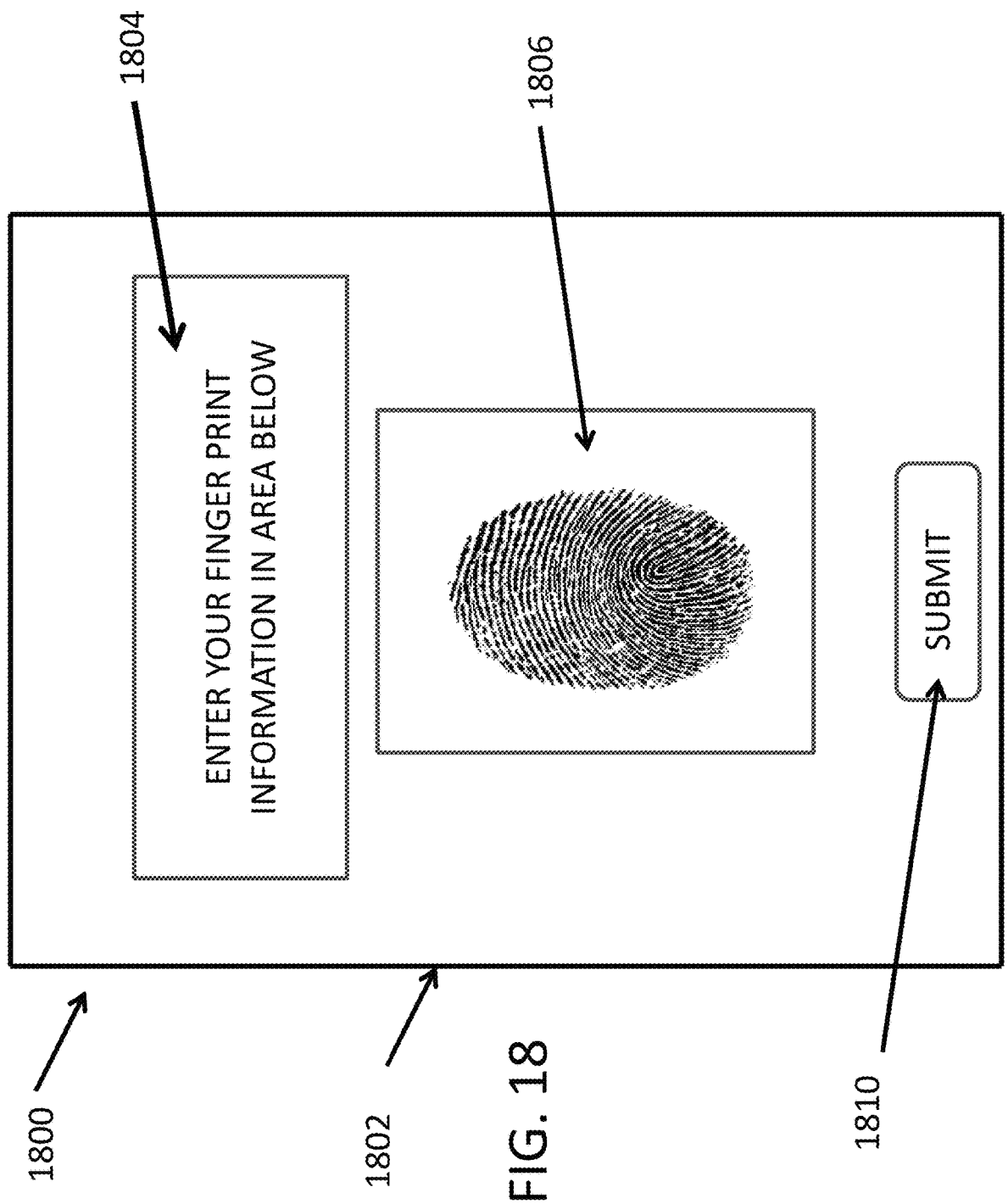
FIG. 18 is an example electronic biometric submission form.

FIG. 18 is an example screen shot 1800 of an electronic biometric submission page 1802 which is electronically displayed on a user device based on a user selecting a "start verification" electronic button, such as described in FIGS. 16 and 17. As shown in FIG. 18, a user (either a law enforcement professional or a person of interest) may enter a fingerprint in a particular area on a user device screen. FIG. 18 shows message area 1804, biometric entry area 1806, and submit button 1808. In embodiments, the biometric information entered onto the touchscreen in biometric entry area 1806 based on information provided in message area 1804. In embodiments, once the biometric information has been entered, the user may electronically select submit button 1808 which results in the biometric information being electronically analyzed and communicated to a server. In embodiments, the server may determine whether the biometric information matches the user's stored biometric information and generate a confirmation or non-confirmation message.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While various actions are described as selecting, displaying, transferring, sending, receiving, generating, notifying, and storing, it will be understood that these example actions are occurring within an electronic computing and/or electronic networking environment and may require one or more computing devices, as described in FIG. 2, to complete such actions. Furthermore, it will be understood that these various actions can be performed by using a touch screen on a computing device (e.g., touching an icon, swiping a bar or icon), using a keyboard, a mouse, or any other process for electronically selecting an option displayed on a display screen to electronically communicate with other computing devices as described in FIG. 2. It will be understood that time information includes time, day, month, and/or year information and may be an electronic time stamp. Also it will be understood that any of the various actions can result in any type of electronic information to be displayed in real-time and/or simultaneously on multiple user devices (e.g., similar to user device 124). For FIGS. 5, 6, 7, and 8, the order of the blocks may be modified in other implementations. Further, non-dependent blocks may be performed in parallel.

In the preceding specification, it should be understood that when two locations are matched to confirm two individuals are at the same location, this may refer to two individuals (via their user devices) that are within a particular distance of each other. For example, the location information may be based on determining an address (e.g., 100 Main Street) that is then used to confirm that two individuals are at the same location. Also, for example, the location information may be compared and considered to be at the same location based on the two individuals (via their user devices) being within a particular distance of each other (e.g., 10 feet of each other, 15 feet of each other, etc.) such that the particular distance is based on the ability of one person to provide confirmation services, in person, to another person.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An electronic communications method, comprising:
   receiving first and second electronic biometric information, wherein the first electronic information is sent from a first user device;
   receiving first electronic location information;
   receiving second electronic location information;
   analyzing the first and the second electronic biometric information;
   the first electronic biometric information and the second electronic biometric information are from different devices;
   analyzing the first electronic location information;
   verifying the first electronic information and the second electronic information; and
   verifying that the first electronic biometric information and the second electronic biometric information are sent from the same geographic region within a particular amount of time.

2. The electronic communications method of claim 1, where the first electronic biometric information is associated with a first person and the first geographic location is associated with the first person.

3. The electronic communications method of claim 2, where the first electronic biometric information is entered via a touch screen device.

4. The electronic communications method of claim 2, where the second electronic biometric information is associated with retina information that is received via a smartphone camera.

5. The electronic communications method of claim 1, where the first electronic biometric information and the first electronic location information is received in real time.

6. The electronic communications method of claim 1, where the first electronic biometric information is a combination of fingerprint information and at least one of:
   retina information,
   voice information, and
   facial information.

7. The electronic communications method of claim 1, where the first electronic biometric information and the first electronic location information are received within one electronic communication.

8. The electronic communications method of claim 1, wherein the analyzing the first electronic biometric information and the verifying the first electronic biometric information is conducted by at least one of:
   a mobile device;
   a computing device;
   a laptop; or
   a smartphone.

9. The electronic communications method of claim 1, wherein prior to receiving the first electronic biometric information, further comprising:
   sending an electronic communication reminder message to the first user device to send the first electronic biometric information within a threshold amount of time.

10. The electronic communications method of claim 1, wherein additional electronic communications are sent to the first user device based on the verifying the first electronic biometric information and the second electronic biometric information are sent from the same geographic location within the particular amount of time.

11. The electronic communications method of claim 1, wherein the first electronic biometric information is associated with electronic identifier information for a law enforcement professional.

12. The electronic communications method of claim 1, wherein the first electronic biometric information is sent to the other user device, associated with the second electronic biometric, before the other user device is in the geographic location at the same time as the user device associated with the first electronic biometric information.

13. A device, comprising:
    memory; and
    a processor to:
      receive first biometric information at a first time;
      receive second biometric information at a second time;
      receive first location information at the first time;
      receive second location information at the second time;
      send the first biometric information to a second user device associated with the second biometric information;
      analyze the received first biometric information with stored biometric information;
      analyze the received first location information with stored location information;
      determine whether the received first biometric information matches the stored biometric information;
      determine that the received first location information matches the stored location information;
      determine that the received second biometric information matches additional stored biometric information;
      determine that a first user device and the second user device are both in a geographic area based on:
        a time difference between the first time and the second time is less than a particular value; and a distance between a first location, associated with the first location information, and a second location, associated with the second location information, is less than another particular value.

14. The device of 13, where the first biometric information is associated with fingerprint information.

15. The device of claim 14, where the received first biometric information is associated with a first person, the received first location information is associated with the first person, and the stored location information is associated with a second person.

16. The device of claim 13, where the received first biometric information is received simultaneously with the received first location information.

17. The device of claim 13, wherein based on determining that the received first biometric information matches the stored biometric information, the processor is further to:
   verify that a person associated with the first biometric information is a law enforcement official; and
   generate an electronic profile of the law enforcement official.

18. The device of claim 13, wherein the first location information does not change over a period of time, while, in the period of time, the second location changes from outside the geographic area to inside the geographic area within a particular distance from the first location.

19. The device of claim 13, where the processor is further to:
   receive third location information; and
   determine that the third location information is associated with another device and that the other device is in the same geographic area at the same time as the first user device and the second user device.

20. A non-transitory computer-readable medium storing instructions, the instructions comprising:
   one or more instructions that, when executed by one or more processors, cause the one or more processors to:
   receive first biometric information at a first time;
   receive second biometric information at a second time
   receive first location information at the first time;
   receive second location information at the second time;
   send the first biometric information to a second user device associated with the second biometric information;
   analyze the received first biometric information with stored biometric information;
   analyze the received first location information with stored location information;
   determine that the received first biometric information matches the stored biometric information;
   determine that the received first location information matches the stored location information;
   determine that the received second biometric information matches additional stored biometric information;
   determine that a first user device and the second user device are both in a geographic area based on:
      a time difference between the first time and the second time is less than a particular value; and
      a distance between a first location, associated with the first location information, and a second location, associated with the second location information, is less than another particular value.

\* \* \* \* \*